United States Patent
Moustafa et al.

(10) Patent No.: US 12,135,665 B2
(45) Date of Patent: Nov. 5, 2024

(54) DEVICE FOR A VEHICLE

(71) Applicant: Intel Corporation, Santa Clara, CA (US)

(72) Inventors: Hassnaa Moustafa, Sunnyvale, CA (US); Rony Ferzli, Chandler, AZ (US); Rita Chattopadhyay, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 17/128,242

(22) Filed: Dec. 21, 2020

(65) Prior Publication Data

US 2021/0109881 A1    Apr. 15, 2021

(51) Int. Cl.
| | | |
|---|---|---|
| G06F 13/40 | (2006.01) | |
| B60W 60/00 | (2020.01) | |
| G06F 13/42 | (2006.01) | |
| H04L 1/00 | (2006.01) | |

(52) U.S. Cl.
CPC ..... *G06F 13/4022* (2013.01); *B60W 60/0059* (2020.02); *G06F 13/4282* (2013.01); *H04L 1/0041* (2013.01); *H04L 1/0076* (2013.01)

(58) Field of Classification Search
CPC .................................................. B60W 60/0059
See application file for complete search history.

(56) References Cited

U.S. PATENT DOCUMENTS

| | | |
|---|---|---|
| 2019/0250610 A1 | 8/2019 | Luo |
| 2019/0339688 A1 | 11/2019 | Cella et al. |
| 2020/0120199 A1* | 4/2020 | Maeng .............. H04M 1/72454 |
| 2020/0128061 A1 | 4/2020 | Esmail et al. |
| 2020/0234396 A1* | 7/2020 | Qi ........................ G06F 12/0207 |
| 2020/0284883 A1* | 9/2020 | Ferreira ................ G01S 7/4816 |
| 2020/0364471 A1* | 11/2020 | Park ....................... G06T 7/0002 |
| 2021/0049381 A1* | 2/2021 | Ju ........................ B60W 30/095 |
| 2021/0127090 A1* | 4/2021 | Kale ........................ G06N 3/08 |

(Continued)

OTHER PUBLICATIONS

European Search Report issued for the corresponding EP patent application No. 21 194 835.1, dated Feb. 24, 2022, 8 pages (For informational purposes only).

(Continued)

*Primary Examiner* — Ilwoo Park
*Assistant Examiner* — Aurangzeb Hassan
(74) *Attorney, Agent, or Firm* — Viering, Jentschura & Partner mbB

(57) ABSTRACT

A device for a vehicle may include a first wireline interface configured to receive a first data stream from a first sensor having a first sensor type for perceiving a surrounding of the vehicle, the first data stream including raw sensor data detected by the first sensor; a second wireline interface configured to receive a second data stream from a second sensor having a second sensor type for perceiving the surrounding of the vehicle, the second data stream including raw sensor data detected by the second sensor; one or more processors configured to generate a coded packet including the received first data stream and the received second data stream by employing vector packet coding on the first data stream and the second data stream; and an output wireline interface configured to transmit the generated coded packet to one or more target units of the vehicle.

17 Claims, 15 Drawing Sheets

(56) References Cited

U.S. PATENT DOCUMENTS

| | | | |
|---|---|---|---|
| 2021/0331655 A1* | 10/2021 | So | B60T 8/885 |
| 2021/0380127 A1* | 12/2021 | Woo | B60W 60/0015 |
| 2021/0398338 A1* | 12/2021 | Philion | G06V 10/774 |
| 2022/0375469 A1* | 11/2022 | Yang | G10L 13/027 |

OTHER PUBLICATIONS

IRTF; "NetWork Coding for Efficient Network Communications Research Group"; https://irtf.org/nwcrg; retrieved on Dec. 7, 2020; 3 pages.

* cited by examiner

FIG. 7

702 Receiving a first data stream from a first sensor having a first sensor type for perceiving a surrounding of a vehicle, wherein the first data stream includes raw sensor data detected by the first sensor representing the surrounding of the vehicle

704 Receiving a second data stream from a second sensor having a second sensor type for perceiving the surrounding of the vehicle, wherein the second data stream includes raw sensor data detected by the second sensor representing the surrounding of the vehicle

706 Generating a coded packet including the first data stream and the second data stream by employing vector packet coding on the first data stream and the second data stream

708 Transmitting the generated coded packet to one or more target units of the vehicle

DEVICE FOR A VEHICLE

TECHNICAL FIELD

Various aspects of this disclosure generally relate to a device for a vehicle.

BACKGROUND

In general, a vehicle, such as an autonomous vehicle, may include various sensors for perceiving a surrounding of the vehicle. Data generated by these sensors may be provided to other devices in the vehicle, such as processing elements for processing the sensor data. However, the sensors may generate a high amount of data, which are streamed to the other devices, resulting in a high expenditure of time. Further, e.g. in autonomous driving, data processing is time-critical, so that a high expenditure of time may lead to the fact that the data are already outdated when processed. To handle the dissemination of the high amount data from the sensors to the processing elements, in order to ensure a real-time constraint of the processing, additional material costs may arise. Therefore, it may be necessary that a data throughput is increased and/or that material costs are reduced.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 7 shows a data transmission method in accordance with various aspects of the disclosure.

DESCRIPTION

Figure 1:
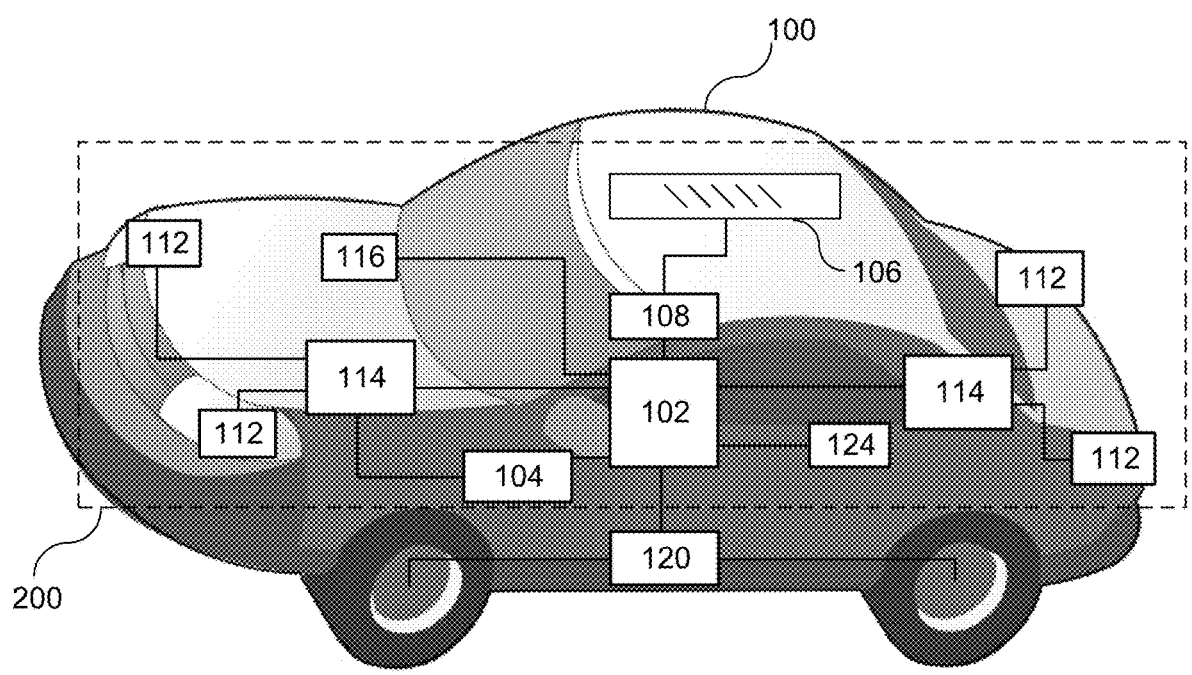
FIG. 1 shows an exemplary autonomous vehicle in accordance with various aspects of the disclosure.

The following detailed description refers to the accompanying drawings that show, by way of illustration, exemplary details and aspects in which the disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The phrases "group (of)", "set (of)", "collection (of)", "series (of)", "sequence (of)", "grouping (of)", etc., and the like in the description and in the claims, if any, refer to a quantity equal to or greater than one, i.e., one or more. The phrases "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group including the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing element", "processing elements", "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), Artificial Intelligence (AI) processor, Artificial Intelligence (AI) accelerator module, etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

The term "real-time" as used herein with respect to a processing (e.g., by a processor) may be understood as a time constraint to perform the processing. For example, a processor processing data in real-time may be understood as a time constraint (e.g., of less than a second, e.g., of less than a millisecond, e.g., of less than hundred microseconds, etc.) between receiving the data and providing an output for the data. For example, a vehicle processing data in real-time may be understood as a time constraint (e.g., of less than two seconds, e.g., of less than one second, e.g., of less than hundred milliseconds, etc.) between detecting data by one or more data ingestion devices and providing control instructions for controlling the vehicle (or performing the control of the vehicle). In some aspects, the time constraint between the detection of data by one or more data ingestion devices and a control of the vehicle based on the detected data may be referred to as reaction time of the vehicle.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. References to a "memory" included herein may also be understood as a non-transitory memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. For example, a processor or controller may transmit or receive data from other devices over a wireline link (in some aspects referred to as wired connection or as wireline connection), such as an Ethernet link, a MIPI (Mobile Industry Processor Interface Alliance) link, a Peripheral Component Interconnect Express (PCIe) link, etc. It is understood that a wireline link between a first device and a second device may include more than one type of link and may include a link via another device. Further, a connection between a first device and a second device may also include a combination of wireline and wireless link via other devices. A wireline link may use any kind of packet based protocol, such as high bandwidth protocols.

The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "wireline interface" may also refer to a wireline data link layer interface. The data link layer may be layer 2 in the OSI model. A "wireline data link layer interface" may refer to a data link layer associated with a wireline protocol, such as Ethernet, MIPI CSI, SATA, PCIe, etc. Hence, a wireline data link layer may be associated with a wireline network.

A "vehicle" may be understood to include any type of driven or drivable object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "vehicle" may be, for example, a ground vehicle, an aerial vehicle, or an aquatic vehicle. A "ground vehicle" may be understood to include any type of vehicle, as described above, which is configured to traverse or be driven on the ground, e.g., on a street, on a road, on a track, on one or more rails, off-road, etc. An "aerial vehicle" may be understood to be any type of vehicle, as described above, which is capable of being maneuvered above the ground for any duration of time, e.g., a drone. Similar to a ground vehicle having wheels, belts, etc., for providing mobility on terrain, an "aerial vehicle" may have one or more propellers, wings, fans, among others, for providing the ability to maneuver in the air. An "aquatic vehicle" may be understood to be any type of vehicle, as described above, which is capable of being maneuvers on or below the surface of liquid, e.g., a boat on the surface of water or a submarine below the surface. It is appreciated that some vehicles may be configured to operate as one of more of a ground, an aerial, and/or an aquatic vehicle.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (e.g., fully operational with driver input or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle, such as the type of propulsion unit(s), types of tires or propellers of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects herein may utilize one or more machine learning models to perform or control functions of the vehicle (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. Various aspects may use a trained machine learning model during an inference phase to make predictions or decisions based on input data. Various aspects may use the trained machine learning model to generate additional training data. Various aspects may adjust an additional machine learning model during a second training phase based on the generated additional training data. Various aspects may use a trained additional machine learning model during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. Various aspects may use the unsupervised model to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data, among others. A classification model as described herein may, for example, classify certain driving conditions and/or environmental conditions, such as weather conditions, road conditions, among others. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward-thinking neural network, a sum-product neural network, among others. The neural network may include any number of layers. The training of the neural network (e.g., adapting the layers of the neural network) may use or may be based on any kind of training principle, such as backpropagation (e.g., using the backpropagation algorithm).

Throughout the disclosure, the following terms may be used as synonyms: data, sensor data, sensor information, detected information, measured information, parameter. These terms may correspond to groups of values generated by a sensor and used to implement one or more models for directing a vehicle to operate according to the manners described herein.

Furthermore, throughout the disclosure, the following terms may be used as synonyms: data ingestion device, data ingestion unit, data acquisition device, data acquisition unit and may correspond to an entity (e.g., device, e.g., unit) configured to obtain (e.g., to ingest, to acquire, to sense, and/or to detect) data.

Furthermore, throughout the disclosure, the following terms may be used as synonyms: wireline link, wireline connection, wired connection, wired link, hardwired connection, hardwired link and may correspond to a transmission medium different from air (e.g., different from wireless communication, such as WIFI, Bluetooth, 3G, 4G, 5G, etc.). For example, a physical wire may be used to establish a wireline link.

Furthermore, throughout the disclosure, the following terms may be used as synonyms: memory device, storage device, data storage device, data logger, content logger and may correspond to a device for storing data.

In order to control an autonomous vehicle, a high amount of data (e.g., up to 1.4 terabytes per hour) may be streamed from a plurality of sensors to processors (e.g., to an AI accelerator module) and (real-time) processed by the processors. Further, the data may be streamed to a memory in the vehicle for storage. However, the data processing is time-critical, so that a high expenditure of time may lead to the fact that the data are already outdated when processed. Therefore, it may be necessary that a data throughput from the plurality of sensors to the processors and/or the memory is increased. Further, it may be desirable to achieve the increased data throughput without an increase in material cost. According to various aspects of the disclosure, a device is provided, which is capable to increase the data throughput in a (wireline) network without an increase in material cost. For example, the device may, in at least one aspect, generate a coded packet including a plurality of data streams from various sensors and transmit the coded packet to the processors and/or the memory.

FIG. 1 shows a vehicle 100 including a mobility system 120 and a control system 200 (see also FIG. 2) in accordance with various aspects of the disclosure. It is appreciated that vehicle 100 and control system 200 are exemplary in nature and may thus be simplified for explanatory purposes. For example, while vehicle 100 is depicted as a ground vehicle, aspects of this disclosure may be equally or analogously applied to aerial vehicles (such as drones) or aquatic vehicles (such as boats). Furthermore, the quantities and locations of elements, as well as relational distances (as discussed above, the figures are not to scale) are provided as examples and are not limited thereto. The components of vehicle 100 may be arranged around a vehicular housing of vehicle 100, mounted on or outside of the vehicular housing, enclosed within the vehicular housing, or any other arrangement relative to the vehicular housing where the components move with vehicle 100 as it travels. The vehicular housing, such as, an automobile body, drone body, plane or helicopter fuselage, boat hull, or similar type of vehicular body is dependent on the type of vehicle implemented as vehicle 100.

In addition to including a control system 200, vehicle 100 may also include a mobility system 120. Mobility system 120 may include components of vehicle 100 related to steering and movement of vehicle 100. In some aspects, where vehicle 100 is an automobile, for example, mobility system 120 may include wheels and axles, a suspension, an engine, a transmission, brakes, a steering wheel, associated electrical circuitry and wiring, and any other components used in the driving of an automobile. In some aspects, where vehicle 100 is an aerial vehicle, mobility system 120 may include one or more of rotors, propellers, jet engines, wings, rudders or wing flaps, air brakes, a yoke or cyclic, associated electrical circuitry and wiring, and any other components used in the flying of an aerial vehicle. In some aspects, where vehicle 100 is an aquatic or sub-aquatic vehicle, mobility system 120 may include any one or more of rudders, engines, propellers, a steering wheel, associated electrical circuitry and wiring, and any other components used in the steering or movement of an aquatic vehicle. In some aspects, mobility system 120 may also include autonomous driving functionality, and accordingly may include an interface with one or more processors 102 (e.g., a processing circuitry) configured to perform autonomous driving computations and decisions and an array of sensors for movement and obstacle sensing. In this sense, the mobility system 120 may be provided with instructions to direct the navigation and/or mobility of vehicle 100 from one or more components of the control system 200 (in some aspects referred to as autonomous vehicle platform). The autonomous driving components of mobility system 120 may also interface with one or more radio frequency (RF) transceivers 108 to facilitate mobility coordination with other nearby vehicular communication devices and/or central networking components that perform decisions and/or computations related to autonomous driving.

Figure 2:
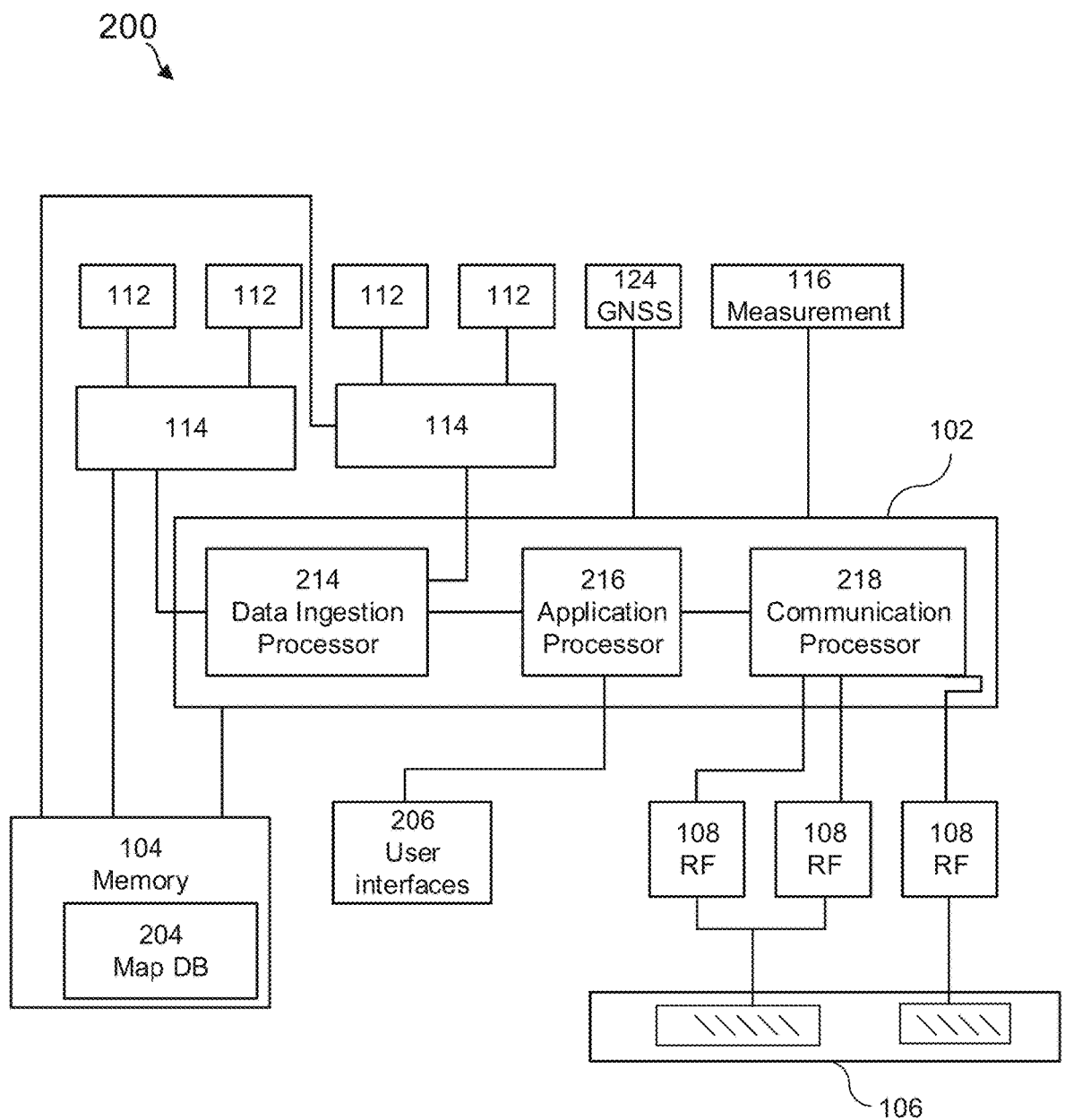
FIG. 2 shows various exemplary electronic components of a safety system of the vehicle in accordance with various aspects of the disclosure.

The control system 200 may include various components depending on the particular implementation. As shown in FIG. 1 and FIG. 2, the control system 200 may include one or more processors 102, one or more memories 104, an antenna system 106 which may include one or more antenna arrays at different locations on the vehicle for radio frequency (RF) coverage, one or more radio frequency (RF) transceivers 108, one or more data ingestion devices 112 (in some aspects referred to as data acquisition devices), one or more position devices 124 which may include components and circuitry for receiving and determining a position based on a Global Navigation Satellite System (GNSS) and/or a Global Positioning System (GPS), and one or more measurement sensors 116, e.g. speedometer, altimeter, gyroscope, velocity sensors, etc.

The control system 200 may be configured to control the vehicle's 100 mobility via mobility system 120 and/or interactions with its environment, e.g. communications with other devices or network infrastructure elements (NIEs) such as base stations, via data ingestion devices 112 and the radio frequency communication arrangement including the one or more RF transceivers 108 and antenna system 106.

The one or more processors 102 may include a data ingestion processor 214, an application processor 216, a communication processor 218, and/or any other suitable processing device. Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 104. In other words, a memory of the one or more memories 104 may store software that, when executed by a processor (e.g., by the one or more processors 102), controls the operation of the system, e.g., a driving and/or safety system. A memory of the one or more memories 104 may store one or more databases and image processing software, as well as a trained system, such as a neural network, or a deep neural network, for example. The one or more memories 104 may include any number of random-access memories, read only memories, flash memories, disk drives, optical storage, tape storage, removable storage and other types of storage. Alternatively, each of processors 214, 216, 218 may include an internal memory for such storage.

The data ingestion processor 214 may include processing circuitry, such as a CPU, for processing data acquired by data ingestion devices 112. For example, if one or more data ingestion devices are implemented as image acquisition units, e.g. one or more cameras, then the data ingestion processor may include image processors for processing image data using the information obtained from the image acquisition units as an input. The data ingestion processor 214 may, therefore, be configured to create voxel maps detailing the surrounding of the vehicle 100 based on the data input from the data ingestion devices 112 (e.g., cameras). According to various aspects, the data ingestion processor 214 may include one or more artificial intelligence (AI) accelerator modules.

An AI accelerator module, as used herein, may be a module configured to perform one or more machine learning tasks, such as employing neural networks. An AI accelerator module may refer to a specialized hardware accelerator or computer system designed to accelerate artificial intelligence (AI) applications, such as artificial neural networks, recurrent neural network, machine vision, and/or machine learning. An AI accelerator module may employ algorithms for robotics, internet of things, and/or other data-intensive or sensor-driven tasks. An AI accelerator module may refer to a system on module. An AI accelerator module may be configured to provide a hardware acceleration for neural networks (e.g., deep neural networks). An AI accelerator module may include one or more interfaces and a plurality of AI chips. An AI accelerator module may include a system on chip (SOC) including the plurality of AI chips. The AI accelerator module may be a multi-core accelerator and each of the plurality of AI chips may refer to a core of the multi-core accelerator. According to various aspects, an AI accelerator module may include further parts or components, such as one or more of a fan for cooling, a monitoring sensor, a control sensor, a housing, etc.

The control system 200 may include one or more (network) devices 114, such as one or more (network) switches. Each of the devices 114 may be connected to one or more of the data ingestion devices 112 via a respective wireline link and may configured to transmit data received from the one or more data ingestion devices 112 to the one or more processors 102 (e.g., to the data ingestion processor 214) via a corresponding wireline link. The device 114 may be configured to transmit data received from the one or more data ingestion devices 112 to the memory 104 via a corresponding wireline connection. For example, if the one or more data ingestion devices are implemented as image acquisition units, e.g. one or more cameras, then the device 114 may receive the data generated by the one or more data ingestion devices via a Mobile Industry Processor Interface Camera Serial Interface (MIPI CSI, i.e., a Camera Serial Interface in accordance with the Mobile Industry Processor Interface Alliance), such as MIPI CSI, MIPI CSI-2, and/or MIPI CSI-3, etc. For example, if the one or more data ingestion devices are implemented as proximity acquisition units, e.g. one or more LIDAR sensors and/or radar sensors, then the device 114 may receive the data generated by the one or more data ingestion devices via an Ethernet link. The device 114 may be configured to transmit data to the one or more processors 102 via any kind of suitable wireline link, such as Peripheral Component Interconnect Express (PCIe), MIPI CSI, etc. The device 114 may be configured to transmit data to the memory 104 via any kind of suitable wireline link, such as Ethernet, Serial AT Attachment (SATA), etc.

Application processor 216 may be a CPU, and may be configured to handle the layers above the protocol stack, including the transport and application layers. Application processor 216 may be configured to execute various applications and/or programs of vehicle 100 at an application layer of vehicle 100, such as an operating system (OS), a user interfaces (UI) 206 for supporting user interaction with vehicle 100, and/or various user applications. Application processor 216 may interface with communication processor 218 and act as a source (in the transmit path) and a sink (in the receive path) for data (e.g., user data), such as voice data, audio/video/image data, messaging data, application data, basic Internet/web access data, etc. In the transmit path, communication processor 218 may therefore receive and process outgoing data provided by application processor 216 according to the layer-specific functions of the protocol stack, and provide the resulting data to digital signal processor 208. Communication processor 218 may then perform physical layer processing on the received data to produce digital baseband samples, which digital signal processor may provide to RF transceiver(s) 108. RF transceiver(s) 108 may then process the digital baseband samples to convert the digital baseband samples to analog RF signals, which RF transceiver(s) 108 may wirelessly transmit via antenna system 106. In the receive path, RF transceiver(s) 108 may receive analog RF signals from antenna system 106 and process the analog RF signals to obtain digital baseband samples. RF transceiver(s) 108 may provide the digital baseband samples to communication processor 218, which may perform physical layer processing on the digital baseband samples. Communication processor 218 may then provide the resulting data to other processors of the one or more processors 102, which may process the resulting data according to the layer-specific functions of the protocol stack and provide the resulting incoming data to application processor 216. Application processor 216 may then handle the incoming data at the application layer, which can include execution of one or more application programs with the data and/or presentation of the data to a user via one or more user interfaces 206. User interfaces 206 may include one or more screens, microphones, mice, touchpads, keyboards, or any other interface providing a mechanism for user input.

The communication processor 218 may include a digital signal processor and/or a controller which may direct such communication functionality of vehicle 100 according to the communication protocols associated with one or more radio access networks, and may execute control over antenna system 106 and RF transceiver(s) 108 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness, the configuration of vehicle 100 shown in FIG. 1 and FIG. 2 may depict only a single instance of such components.

Vehicle 100 may transmit and receive wireless signals with antenna system 106, which may be a single antenna or an antenna array that includes multiple antenna elements. In some aspects, antenna system 202 may additionally include analog antenna combination and/or beamforming circuitry. In the receive (RX) path, RF transceiver(s) 108 may receive analog radio frequency signals from antenna system 106 and perform analog and digital RF front-end processing on the analog radio frequency signals to produce digital baseband samples (e.g., In-Phase/Quadrature (IQ) samples) to provide to communication processor 218. RF transceiver(s) 108 may include analog and digital reception components including amplifiers (e.g., Low Noise Amplifiers (LNAs)), filters, RF demodulators (e.g., RF IQ demodulators)), and analog-to-digital converters (ADCs), which RF transceiver(s) 108 may utilize to convert the received radio frequency signals to digital baseband samples. In the transmit (TX) path, RF transceiver(s) 108 may receive digital baseband samples from communication processor 218 and perform analog and digital RF front-end processing on the digital baseband samples to produce analog radio frequency signals to provide to antenna system 106 for wireless transmission. RF transceiver(s) 108 may thus include analog and digital transmission components including amplifiers (e.g., Power Amplifiers (PAs), filters, RF modulators (e.g., RF IQ modulators), and digital-to-analog converters (DACs), which RF transceiver(s) 108 may utilize to mix the digital baseband samples received from communication processor 218 and produce the analog radio frequency signals for wireless transmission by antenna system 106. In some aspects, communication processor 218 may control the radio transmission and reception of RF transceiver(s) 108, including specifying the transmit and receive radio frequencies for operation of RF transceiver(s) 108.

According to some aspects, communication processor 218 includes a baseband modem configured to perform physical layer (PHY, Layer 1) transmission and reception processing to, in the transmit path, prepare outgoing transmit data provided by communication processor 218 for transmission via RF transceiver(s) 108, and, in the receive path, prepare incoming received data provided by RF transceiver(s) 108 for processing by communication processor 218. The baseband modem may include a digital signal processor and/or a controller. The digital signal processor may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancelation, and any other physical layer processing functions. The digital signal processor may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, the digital signal processor may include one or more processors configured to retrieve and execute program code that defines control and processing logic for physical layer processing operations. In some aspects, the digital signal processor may execute processing functions with software via the execution of executable instructions. In some aspects, the digital signal processor may include one or more dedicated hardware circuits (e.g., ASICs, FPGAs, and other hardware) that are digitally configured to specific execute processing functions, where the one or more processors of digital signal processor may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of the digital signal processor may be realized as a coupled integrated circuit.

Vehicle 100 may be configured to operate according to one or more radio communication technologies. The digital signal processor of the communication processor 218 may be responsible for lower-layer processing functions (e.g., Layer 1/PHY) of the radio communication technologies, while a controller of the communication processor 218 may be responsible for upper-layer protocol stack functions (e.g., Data Link Layer/Layer 2 and/or Network Layer/Layer 3). The controller may thus be responsible for controlling the radio communication components of vehicle 100 (antenna system 106, RF transceiver(s) 108, position device 124, etc.) in accordance with the communication protocols of each supported radio communication technology, and accordingly may represent the Access Stratum and Non-Access Stratum (NAS) (also encompassing Layer 2 and Layer 3) of each supported radio communication technology. The controller may be structurally embodied as a protocol processor configured to execute protocol stack software (retrieved from a controller memory) and subsequently control the radio communication components of vehicle 100 to transmit and receive communication signals in accordance with the corresponding protocol stack control logic defined in the protocol stack software. The controller may include one or more processors configured to retrieve and execute program code that defines the upper-layer protocol stack logic for one or more radio communication technologies, which can include Data Link Layer/Layer 2 and Network Layer/Layer 3 functions. The controller may be configured to perform both user-plane and control-plane functions to facilitate the transfer of application layer data to and from vehicle 100 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by the controller of communication processor 218 may include executable instructions that define the logic of such functions.

In some aspects, vehicle 100 may be configured to transmit and receive data according to multiple radio communication technologies. Accordingly, in some aspects one or more of antenna system 106, RF transceiver(s) 108, and communication processor 218 may include separate components or instances dedicated to different radio communication technologies and/or unified components that are shared between different radio communication technologies. For example, in some aspects, multiple controllers of communication processor 218 may be configured to execute multiple protocol stacks, each dedicated to a different radio communication technology and either at the same processor or different processors. In some aspects, multiple digital signal processors of communication processor 218 may include separate processors and/or hardware accelerators that are dedicated to different respective radio communication technologies, and/or one or more processors and/or hardware accelerators that are shared between multiple radio communication technologies. In some aspects, RF transceiver(s) 108 may include separate RF circuitry sections dedicated to different respective radio communication technologies, and/or RF circuitry sections shared between multiple radio communication technologies. In some aspects, antenna system 106 may include separate antennas dedicated to different respective radio communication technologies, and/or antennas shared between multiple radio communication technologies. Accordingly, antenna system 106, RF transceiver(s) 108, and communication processor 218 can encompass separate and/or shared components dedicated to multiple radio communication technologies.

Communication processor 218 may be configured to implement one or more vehicle-to-everything (V2X) communication protocols, which may include vehicle-to-vehicle (V2V), vehicle-to-infrastructure (V2I), vehicle-to-network (V2N), vehicle-to-pedestrian (V2P), vehicle-to-device (V2D), vehicle-to-grid (V2G), and other protocols. Communication processor 218 may be configured to transmit communications including communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

Communication processor 218 may be configured to operate via a first RF transceiver of the one or more RF transceivers(s) 108 according to different desired radio communication protocols or standards. By way of example, communication processor 218 may be configured in accordance with a Short-Range mobile radio communication standard, such as Bluetooth, Zigbee, among others, and the first RF transceiver may correspond to the corresponding Short-Range mobile radio communication standard. As another example, communication processor 218 may be configured to operate via a second RF transceiver of the one or more RF transceivers(s) 108 in accordance with a Medium or Wide Range mobile radio communication standard such as a 3G (e.g. Universal Mobile Telecommunications System—UMTS), a 4G (e.g. Long Term Evolution—LTE), a 5G mobile radio communication standard in accordance with corresponding 3GPP ($3^{rd}$ Generation Partnership Project) standards, among others. As a further example, communication processor 218 may be configured to operate via a third RF transceiver of the one or more RF transceivers(s) 108 in accordance with a Wireless Local Area Network communication protocol or standard, such as in accordance with IEEE 802.11 (e.g. 802.11, 802.11a, 802.11b, 802.11g, 802.11n, 802.11p, 802.11-12, 802.11ac, 802.11ad, 802.11ah, among others). The one or more RF transceiver(s) 108 may be configured to transmit signals via antenna system 106 over an air interface. The RF transceivers 108 may each have a corresponding antenna element of antenna system 106, or may share an antenna element of the antenna system 106.

Memory 104 may embody a memory component of vehicle 100, such as a hard drive or another such permanent memory device. Although not explicitly depicted in FIGS. 1 and 2, the various other components of vehicle 100, e.g. one or more processors 102, shown in FIGS. 1 and 2 may additionally each include integrated permanent and non-permanent memory components, such as for storing software program code, buffering data, etc.

The antenna system 106 may include a single antenna or multiple antennas. In some aspects, each of the one or more antennas of antenna system 106 may be placed at a plurality of locations on the vehicle 100 in order to increase RF coverage. The antennas may include a phased antenna array, a switch-beam antenna array with multiple antenna elements, etc. Antenna system 106 may be configured to operate according to analog and/or digital beamforming schemes in order to signal gains and/or provide levels of information privacy. Antenna system 106 may include separate antennas dedicated to different respective radio communication technologies, and/or antennas shared between multiple radio communication technologies. While shown as a single element in FIG. 1, antenna system 106 may include a plurality of antenna elements (e.g., antenna arrays) positioned at different locations on vehicle 100. The placement of the plurality of antenna elements may be strategically chosen in order to ensure a desired degree of RF coverage. For example, additional antennas may be placed at the front, back, corner(s), and/or on the side(s) of the vehicle 100.

Data ingestion devices 112 may include any number of data ingestion devices and components depending on the requirements of a particular application. This may include: image acquisition devices, proximity detectors, acoustic sensors, infrared sensors, piezoelectric sensors, etc., for providing data about the vehicle's environment. Image acquisition devices may include cameras (e.g., standard cameras, digital cameras, video cameras, single-lens reflex cameras, infrared cameras, stereo cameras, etc.), charge coupling devices (CCDs) or any type of image sensor. Proximity detectors may include radar sensors, light detection and ranging (LIDAR) sensors, mmWave radar sensors, etc. Acoustic sensors may include: microphones, sonar sensors, ultrasonic sensors, etc. Accordingly, each of the data ingestion devices may be configured to observe a particular type of data of the vehicle's 100 environment and forward the data to the data ingestion processor 214 in order to provide the vehicle with an accurate portrayal of the vehicle's environment. The data ingestion devices 112 may be configured to implement pre-processed sensor data, such as radar target lists or LIDAR target lists, in conjunction with acquired data.

The term "raw sensor data" may be understood as sensor data as outputted by a sensor. For example, "raw sensor data" may refer to unprocessed data generated by a data ingestion device 112. A data ingestion device 112, as used herein, may be configured to pre-process detected data and to output the pre-processed data. For example, a data ingestion device 112 may include a smart sensor configured to pre-process sensed data and the "raw sensor data" may refer to the pre-processed data (e.g., target lists in the case of a radar sensor) outputted by the data ingestion device 112.

Measurement devices 116 may include other devices for measuring vehicle-state parameters, such as a velocity sensor (e.g., a speedometer) for measuring a velocity of the vehicle 100, one or more accelerometers (either single axis or multi-axis) for measuring accelerations of the vehicle 100 along one or more axes, a gyroscope for measuring orientation and/or angular velocity, odometers, altimeters, thermometers, a humidity sensor (e.g., a hygrometer) for measuring a humidity, a distance meter to measure a roughness of a ground, a pressure sensor for measuring a pressure in the surround of the vehicle 100, a torque sensor for measuring a torque of the vehicle 100, a steering angle sensor for measuring a steering angle or a turning angle of the vehicle 100, etc. It is appreciated that vehicle 100 may have different measurement devices 116 depending on the vehicle type, e.g., car vs. drone vs. boat.

Position devices 124 may include components for determining a position of the vehicle 100. For example, this may include global position system (GPS) or other global navigation satellite system (GNSS) circuitry configured to receive signals from a satellite system and determine a position of the vehicle 100. Position devices 124, accordingly, may provide vehicle 100 with satellite navigation features.

The one or more memories 104 may store data, e.g., in a database or in any different format, that may correspond to a map. For example, the map may indicate a location of known landmarks, roads, paths, network infrastructure elements, or other elements of the vehicle's 100 environment. The one or more processors 102 may process sensory information (such as images, radar signals, depth information from LIDAR, stereo processing of two or more images, etc.) of the environment of the vehicle 100 together with position information (such as a GPS coordinate, a vehicle's ego-motion, etc.) to determine a current location of the vehicle 100 relative to the known landmarks, and refine the determination of the vehicle's location. Certain aspects of this technology may be included in a localization technology such as a mapping and routing model.

The map database (DB) 204 may include any type of database storing (digital) map data for the vehicle 100, e.g., for the control system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In some aspects, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields, such as landmark type, landmark location, among other potential identifiers.

Furthermore, the control system 200 may include a driving model, e.g., implemented in an advanced driving assistance system (ADAS) and/or a driving assistance and automated driving system. By way of example, the control system 200 may include (e.g., as part of the driving model) a computer implementation of a formal model, such as a safety driving model. The control system 200 may be or may include a safety system 200 and may include (e.g., as part of the driving model) a computer implementation of a safety driving model. A safety driving model may be or include a mathematical model formalizing an interpretation of applicable laws, standards, policies, etc. that are applicable to self-driving vehicles. A safety driving model may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic and in turn limit the scalability of system deployment; and third, the interpretation should be efficiently verifiable in the sense that it can be rigorously proven that the self-driving (autonomous) vehicle correctly implements the interpretation of the law. A safety driving model, illustratively, may be or include a mathematical model for safety assurance that enables identification and performance of proper responses to dangerous situations such that self-perpetrated accidents can be avoided.

As described above, the vehicle 100 may include the control system 200 as also described with reference to FIG. 2. The vehicle 100 may include the one or more processors 102 integrated with or separate from an engine control unit (ECU) which may be included in the mobility system 120 of the vehicle 100. The control system 200 may, in general, generate data to control or assist to control the ECU and/or other components of the vehicle 100 to directly or indirectly control the movement of the vehicle 100 via mobility system 120. The one or more processors 102 of the vehicle 100 may be configured to implement the aspects and methods described herein.

The components illustrated in FIGS. 1 and 2 may be operatively connected to one another via any appropriate interfaces. Furthermore, it is appreciated that not all the connections between the components are explicitly shown, and other interfaces between components may be covered within the scope of this disclosure.

FIG. 3A to FIG. 3D each show an exemplary device 114 for a vehicle (e.g., the vehicle 100), in accordance with various aspects of the disclosure. The one or more data ingestion devices 112 may include a first sensor 112A and a second sensor 112B. The second sensor 112B may be different from the first sensor 112A. The first sensor 112A may have a first sensor type for perceiving a surrounding of the vehicle 100. For example, the first sensor 112A may be an image acquisition device, such as a camera (e.g., a standard camera, a digital camera, a video camera, a single-lens reflex camera, an infrared camera, a stereo camera, etc.), a charge coupling device (CCDs) or any type of image sensor, a proximity detector, such as a radar sensor, a LIDAR sensor, a mmWave radar sensor, etc., or an acoustic sensor, such as a microphone, a sonar sensor, an ultrasonic sensor, etc. The second sensor 112B may have a second sensor type for perceiving a surrounding of the vehicle 100. By way of example, the first sensor 112A may be an image acquisition device, such as a camera (e.g., a standard camera, a digital camera, a video camera, a single-lens reflex camera, an infrared camera, a stereo camera, etc.), a charge coupling device (CCDs) or any type of image sensor, a proximity detector, such as a radar sensor, a LIDAR sensor, a mmWave radar sensor, etc., or an acoustic sensor, such as a microphone, a sonar sensor, an ultrasonic sensor, etc. The first sensor 112A may be configured to provide a first data stream 302 (e.g., to transmit the first data stream 302 to the device 114). The first data stream 302 may include raw sensor data detected by the first sensor 112A representing the surrounding of the vehicle 100. According to various aspects, the first sensor 112A may be configured to provide the first data stream 302 (e.g. as a raw data stream, e.g., as an unencrypted data stream) to the device 114. The second sensor 112B may be configured to provide a second data stream 304 (e.g., to transmit the second data stream 304 to the device 114). The second data stream 304 may include raw sensor data detected by the second sensor 112B representing the surrounding of the vehicle 100. According to various aspects, the second sensor 112B may be configured to provide the second data stream 304 (e.g. as a raw data stream, e.g., as an unencrypted data stream) to the device 114. For example, the data streams provided by the first sensor 302 and/or the second sensor 304 may not be channel coded and/or source coded. The data streams provided by the first sensor 302 and/or the second sensor 304 may be vehicle operation data.

The device 114 may be a network device. The device 114 may include a first wireline interface 306 (in some aspects referred to as first wireline data link layer interface). The first wireline interface 306 may be configured to receive the first data stream 302 from the first sensor 112A. The first wireline interface 306 may be configured to receive the first data stream 302 from the first sensor 112A via a first wireline link (in some aspects referred to as first wired connection or as first wireline connection), such as a cable or fiber. The device 114 may include a second wireline interface 308 (in some aspects referred to as second wireline data link layer interface). The second wireline interface 308 may be configured to receive the second data stream 304 from the second sensor 112B. The second wireline interface 308 may be configured to receive the second data stream 304 from the second sensor 112B via a second wireline link (in some aspects referred to as second wired connection or as second wireline connection), such as a cable or fiber.

According to various aspects, the first wireline link and the second wireline link may be of the same type. For example, the first wireline link and the second wireline link may each be associated with a respective Ethernet link. In this case, the device 114 may include an Ethernet interface having a plurality of ports and the first wireline interface 306 and the second wireline interface 308 may each be associated with a corresponding port of the plurality of ports of the Ethernet interface. For example, the first wireline link and the second wireline link may each be associated with a respective MIPI CSI link. In this case, the device 114 may include a MIPI CSI having a plurality of ports and the first wireline interface 306 and the second wireline interface 308 may each be associated with a corresponding port of the plurality of ports of the MIPI CSI. The first sensor type of the first sensor 112A and the second sensor type of the second sensor 112B may be of a similar sensor type. For example, the first sensor 112A and the second sensor 112B may each be a camera sensor connected to the device 114 via a respective wireline link, such as a MIPI CSI link. The first sensor type of the first sensor 112A and the second sensor type of the second sensor 112B may be different from one another. For example, the first sensor 112A may be a LIDAR sensor and the second sensor 112B may be a radar sensor. The LIDAR sensor and the radar sensor may each be connected to the device 114 via a respective wireline link, such as an Ethernet link.

According to various aspects, the first wireline link and the second wireline link may be of different types. In this case, the first wireline interface 306 and the second wireline interface 308 may refer to different types of network interfaces. For example, the first wireline link may be a MIPI CSI link and the second wireline link may be an Ethernet link. In this case, the first wireline interface 306 may be a MIPI CSI and the second wireline interface 308 may be an Ethernet interface. The first sensor type of the first sensor 112A and the second sensor type of the second sensor 112B may be different from one another. For example, the first sensor 112A may be a camera sensor and the second sensor 112B may be a LIDAR sensor. The camera sensor may be connected to the device 114 via the MIPI CSI link and the LIDAR sensor may be connected to the device 114 via the Ethernet link.

Figure 3A:
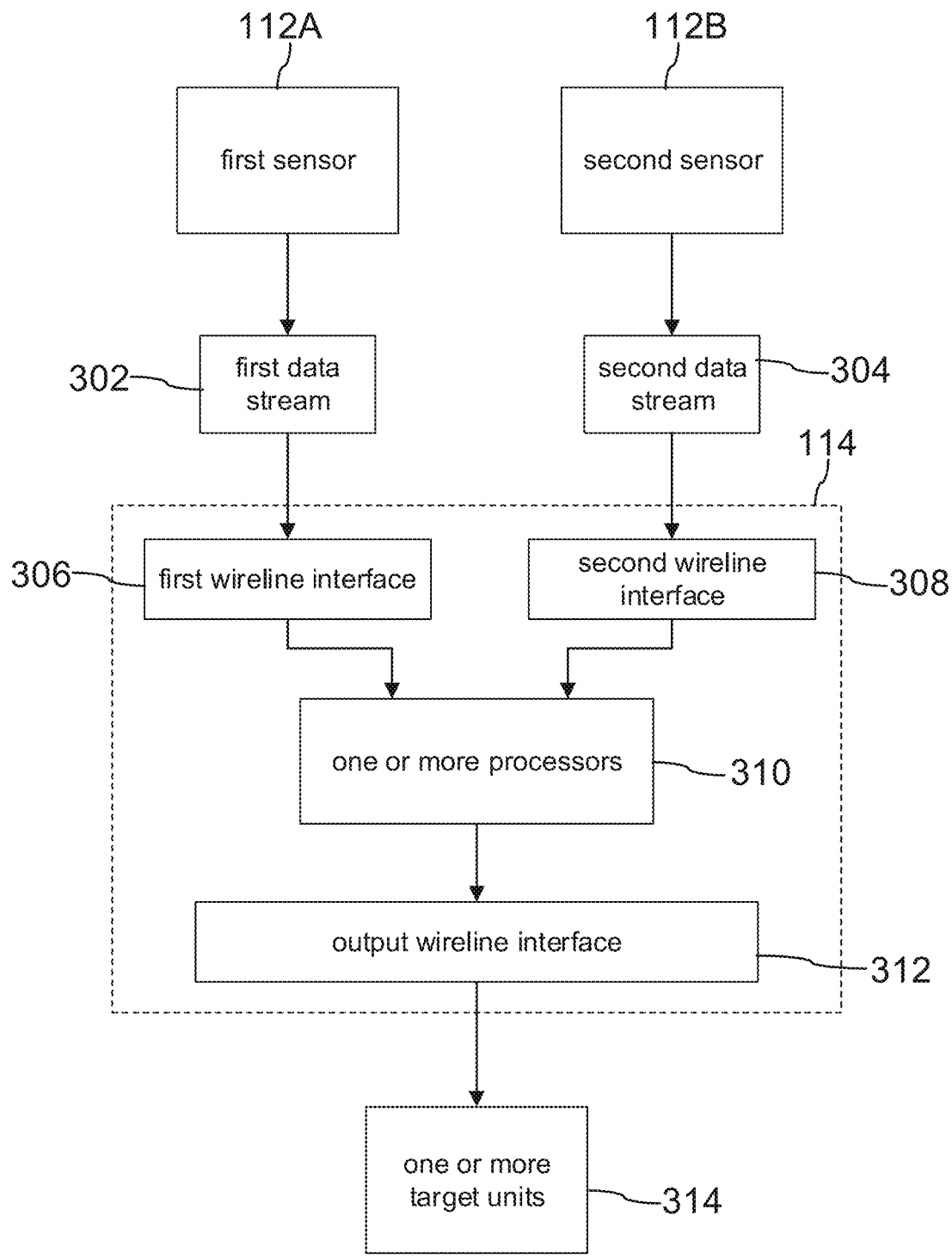
FIG. 3A to FIG. 3D each show an exemplary device for a vehicle in accordance with various aspects of the disclosure.
Figure 3B:
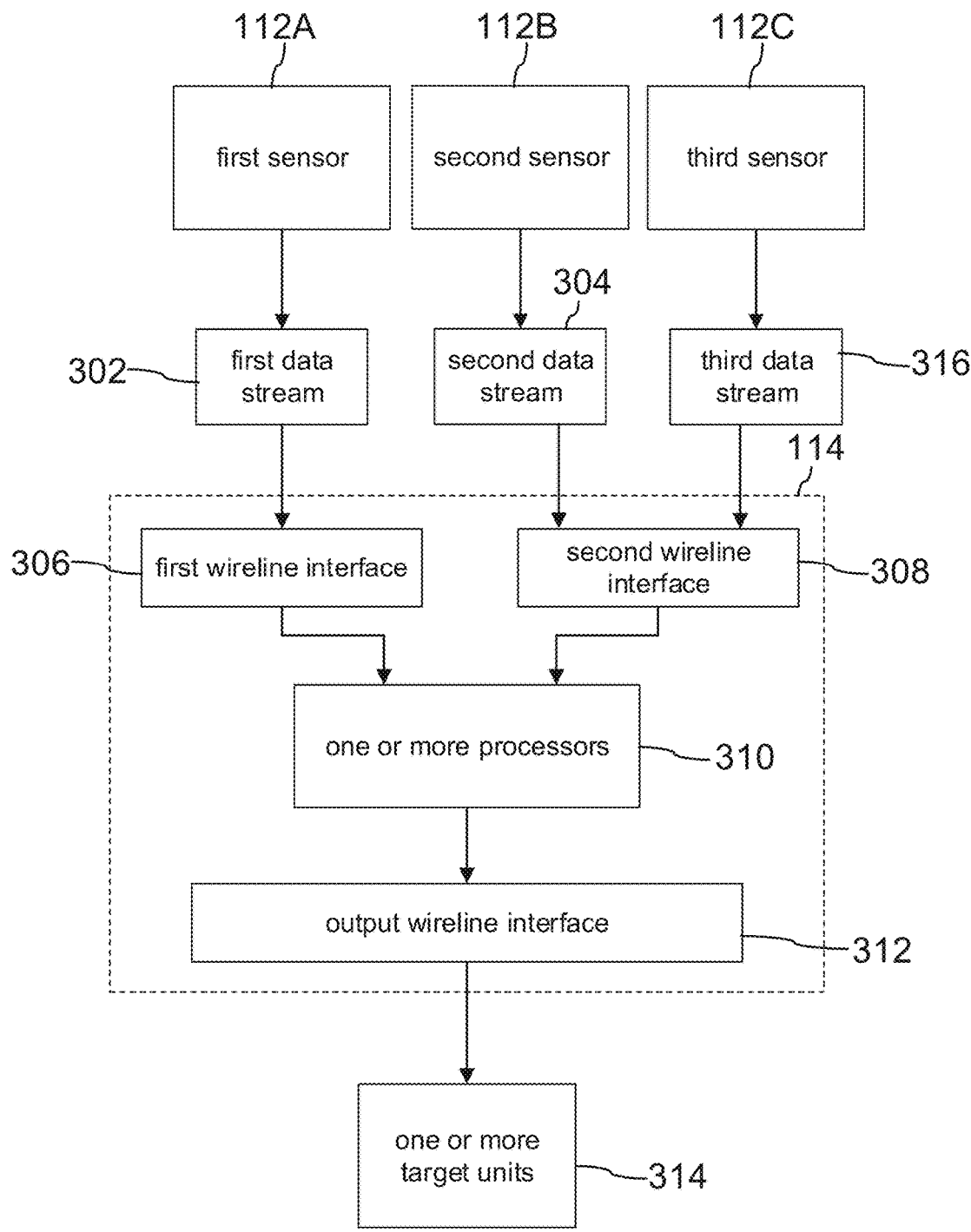
Figure 3C:
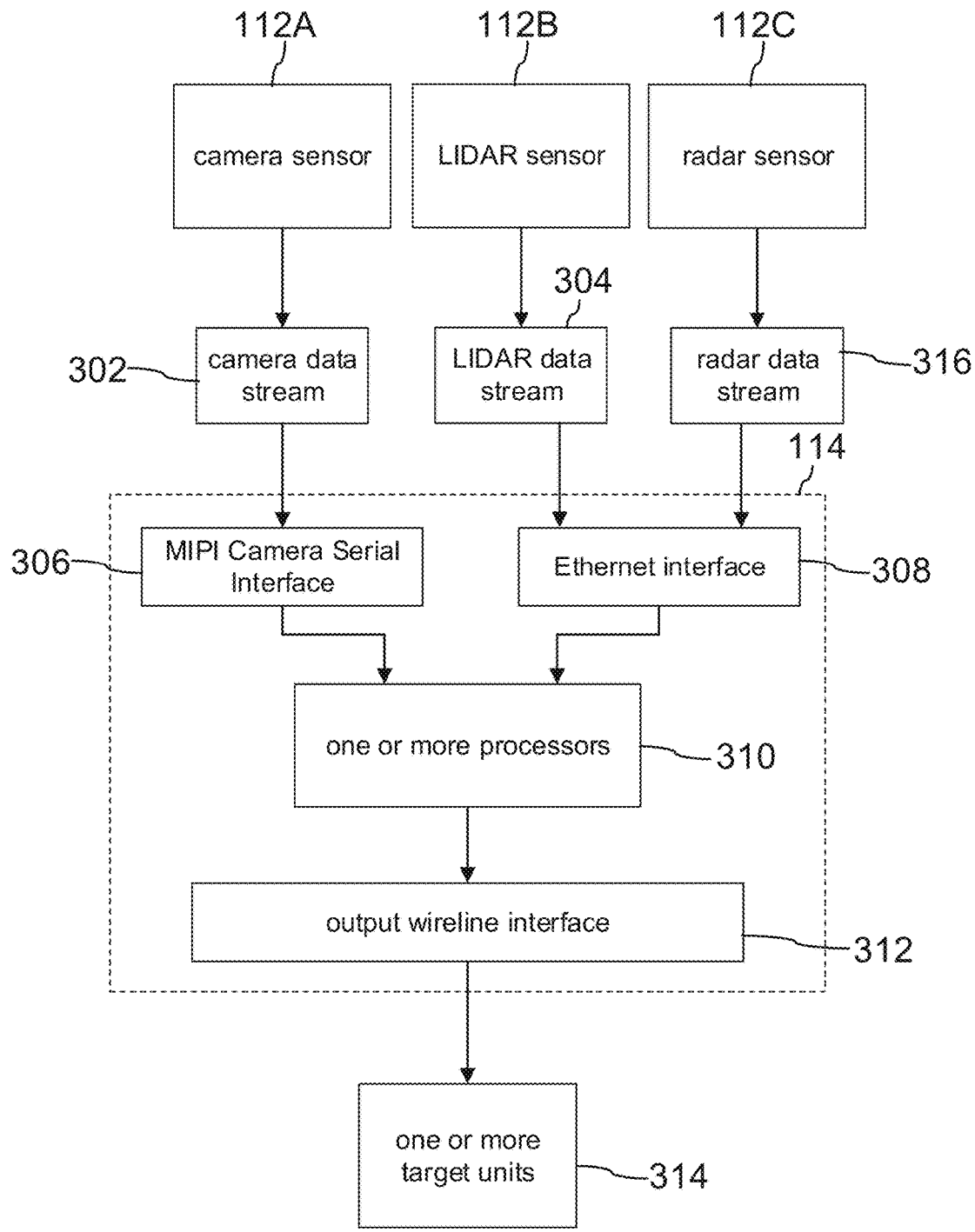

The vehicle 100 may include a plurality of data ingestion devices 112 configured to provide a respective data stream to the device 114. The device 114 may receive each data stream from the plurality of data ingestion devices 112 via respective wireline interface, as described above. For example, the first wireline interface 306 may include a plurality of ports and the first wireline interface 306 may be configured to receive the respective data stream from a first group of the plurality of data ingestion devices 112 via a corresponding port of the plurality of ports. For example, the second wireline interface 308 may include a plurality of ports and the second wireline interface 308 may be configured to receive the respective data stream from a first group of the plurality of data ingestion devices 112 via a corresponding port of the plurality of ports. As exemplarily shown in FIG. 3B, the device 114 may further include a third sensor 112C configured to provide a third data stream 316. The third sensor 112C may have a third sensor type for perceiving the surrounding of the vehicle 100. As described herein with reference to the first sensor 112A and the second sensor 112B, the third sensor 112C may be connected to the second wireline interface 308 via an associated wireline link equal to or different from the wireline links associated with the first sensor 112A and the second sensor 112B. The second wireline interface 308 may be configured to receive the third data stream 316 (e.g., via a respective port). An exemplary configuration is shown in FIG. 3C. In this example, the first sensor 112A may be a camera sensor configured to provide a camera data stream as the first data stream 302, the second sensor 112B may be a LIDAR sensor configured to provide a LIDAR data stream as the second data stream 304, and the third sensor 112B may be a radar sensor configured to provide a radar data stream as the third data stream 316. The first wireline interface 306 may be a MIPI CSI configured to receive the camera data stream and the second wireline interface 308 may be an Ethernet interface configured to receive the LIDAR data stream and the radar data stream (e.g., via a respective port of the Ethernet interface). It is understood that the device 114 may include a plurality of wireline interfaces configured to receive data streams from one or more data ingestion devices 112 and that each of the plurality of wireline interfaces may include a plurality of ports such that a data stream from a respective data ingestion device 112 may be received via each of the plurality of ports.

The device 114 may include one or more processors 310 (e.g., one or more processing elements, e.g., one or more of the one or more processors 102). The one or more processors 310 may be configured to process the data streams received via the first wireline interface 306 and the second wireline interface 308. The one or more processors 310 may be configured to generate a coded packet including the received first data stream 302 and the received second data stream 304 (see, for example, FIG. 3A). The one or more processors 310 may be configured to generate the coded packet including the received first data stream 302 and the received second data stream 304 by employing vector packet coding on the first data stream 302 and the second data stream 304. In vector packet coding (in some aspects referred to as network coding), data packets of a data stream may be linked (e.g., associated with) to respective symbols, as exemplarily shown in equation (1):

$$\begin{bmatrix} y(e_1) \\ \vdots \\ y(e_h) \end{bmatrix} = \begin{bmatrix} g_1(e_1) & \cdots & g_h(e_1) \\ \vdots & \ddots & \vdots \\ g_1(e_h) & \cdots & g_h(e_h) \end{bmatrix} \begin{bmatrix} x_1 \\ \vdots \\ x_h \end{bmatrix}, \quad (1)$$

wherein $g_1(e_1)$ to $g_1(e_h)$ may designate a number of h data packets in a first data stream $g_1$;
wherein $g_h(e_1)$ to $g_h(e_h)$ may designate a number of h data packets in an h-th data stream $g_h$;
wherein $x_1$ to $x_h$ may be a number of h symbols of a symbol vector x; and
wherein by multiplying the matrix defined by the first data stream and the h-th data stream with the symbol vector x, a coded vector y may be generated. The coded vector y may include a number of h elements. For example, in the case of generating a coded packet including the first data stream 302 and the second data stream 304, $g_1(e_1)$ to $g_h(e_1)$ may be the first data stream 302 and $g_1(e_h)$ to $g_h(e_h)$ may be the second data stream 304 (i.e., h=2). According to various aspects, each symbol of the symbol vector x may have a size of one byte. Illustratively, the symbol vector x may define an equation symbol and decoding the coded vector y may include solving the equation system to determine the data streams included in the coded vector y. The coded packet may include a packet identification (e.g., a group number), an encoding vector (in some aspects referred to as global encoding vector), and the coded vector y. The encoding vector may describe the coding operation performed. Hence, a decoding may employ the encoding vector to solve the equation system given by the coded vector y.

Illustratively, data streams are fused (to a coded packet) independent of the data type. Illustratively, the amount of information per transmission may be increased.

With reference to equation (1), the one or more processors 310 may be configured to generate a coded packet including a number of h data streams. For example, the coded packet may include the first data stream 302, the second data stream 304, and the third data stream 316 (see, for example, FIG. 3B and/or FIG. 3C).

According to various aspects, each data ingestion device 112 of the plurality of data ingestion devices 112 may be configured to provide a plurality of data streams to the device 114. Each data stream may include raw sensor data detected by the respective data ingestion device 112. The one or more processors 310 may be configured to generated the coded packet such that the generated coded packet includes one or more data streams of the plurality of data streams provided by one or more of the plurality of data ingestion devices 112 (e.g., such that the coded packet includes a total number of h data streams as described with reference to equation (1)). As exemplarily shown in FIG. 3D, the first sensor 112A may be configured to provide a plurality of first data streams 322 and the second sensor 112B may be configured to provide a plurality of second data streams 324. The one or more processors 310 may be configured to generated the coded packet such that the generated coded packet includes one or more first data streams of the plurality of first data streams 322 and/or one or more second data streams of the plurality of second data streams 324.

Although various aspects exemplarily describe data ingestion devices to provide the data streams it is noted that any type of sensor or detector may be configured to sense or detect data descriptive of the surrounding of the vehicle and/or a state of the vehicle and to provide the sensed or detected data as data streams to the device 114. The device 114 may include any suitable wireline interface to receive the sensed or detected data from the respective sensor or detector.

The device 114 may include an output wireline interface 312 (in some aspects referred to as output wireline data link layer interface). The output wireline interface 312 may be configured to transmit the generated coded packet to one or more target units 314 of the vehicle 100. The output wireline interface 312 may be configured to transmit the generated coded packet to the one or more target units 314 via a respective wireline link. Each of the one or more target units 314 may be configured to decode the coded packet to obtain the data streams included in the coded packet. According to various aspects, a target unit 314 may be configured to decode the coded packet using the encoding vector included in the data packet, as described with reference to equation (1).

Figure 4A:
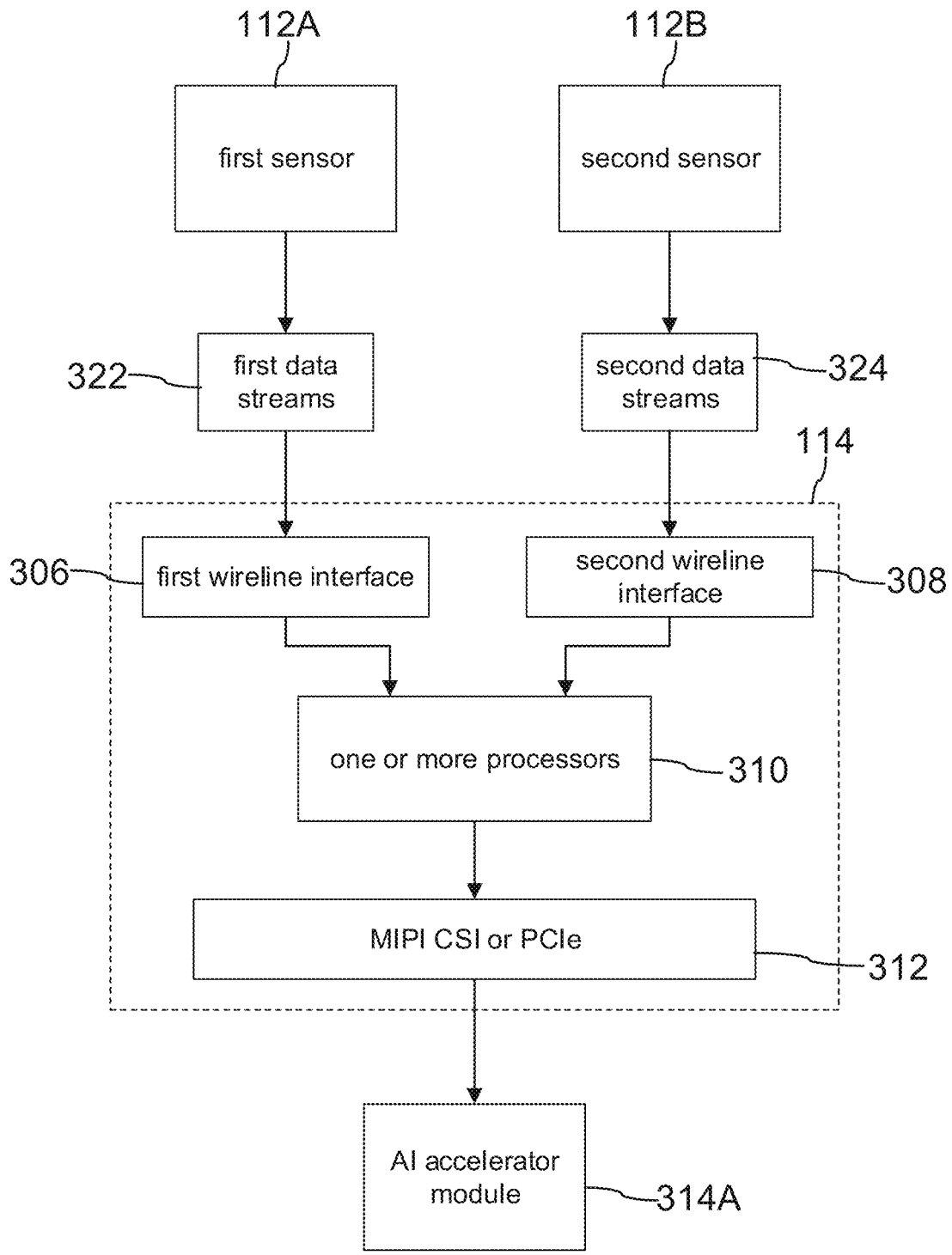
FIG. 4A to FIG. 4C each show an exemplary device for transmitting data to an AI accelerator module, in accordance with various aspects of the disclosure.
Figure 4B:
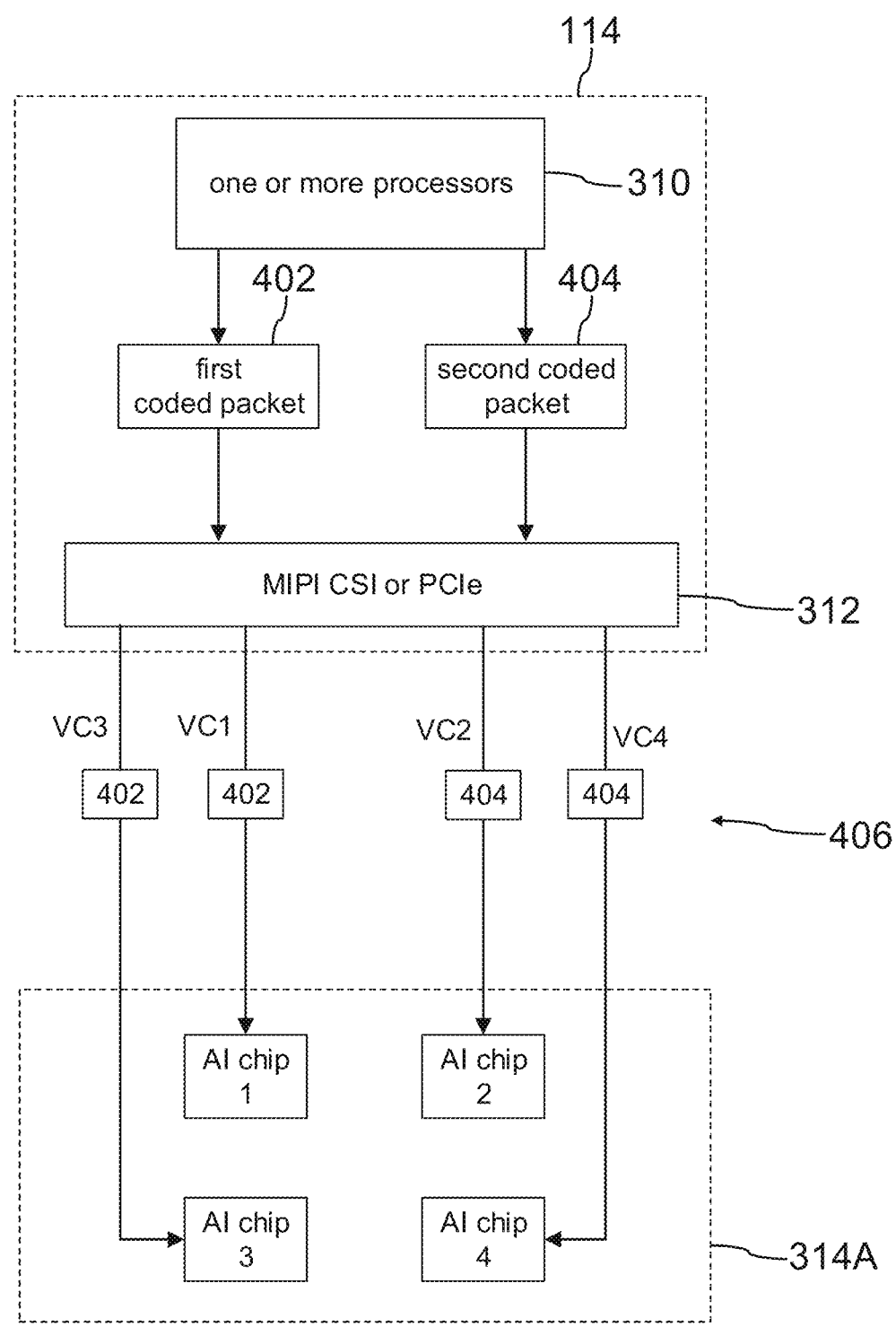
Figure 4C:
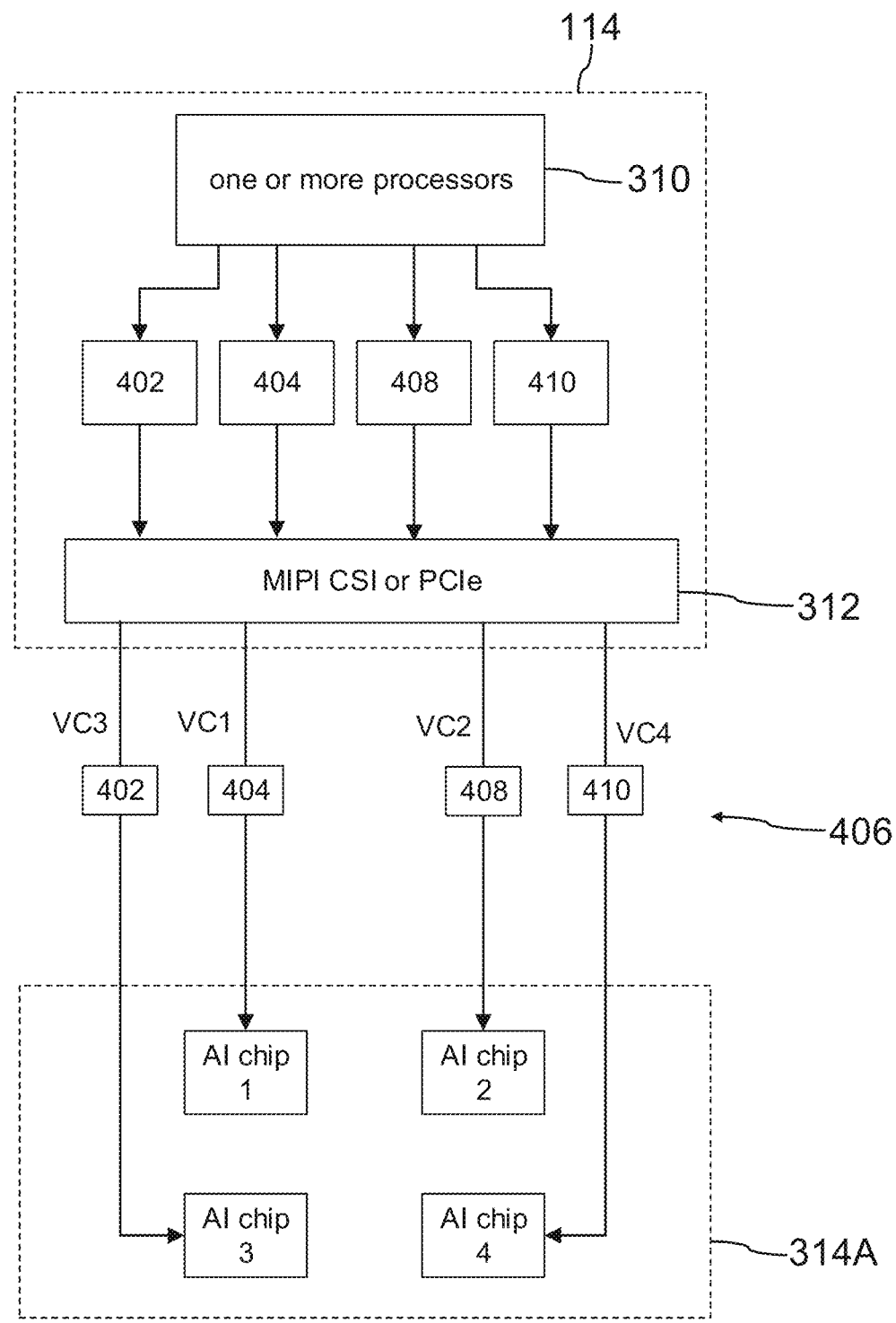

For example, the one or more target units 314 may include at least one artificial intelligence (AI) accelerator module and the output wireline interface 312 may be configured to transmit the generated coded packet to the AI accelerator module (see, for example, FIG. 4A to FIG. 4C). According to various aspects, the output wireline interface 312 may be configured to transmit the generated coded packet to the AI accelerator module via a MIPI CSI link and/or a PCIe link. In this case, the output wireline interface 312 may be or may include a MIPI CSI and/or a PCIe interface. For example, the one or more target units 314 may include at least one memory device and the output wireline interface 312 may be configured to transmit the generated coded packet to the memory device (see, for example, FIG. 5A to FIG. 5D). According to various aspects, the output wireline interface 312 may be configured to transmit the generated coded packet to the memory device via an Ethernet link and/or a SATA link. In this case, the output wireline interface 312 may be or may include an Ethernet interface and/or a SATA interface. According to various aspects, the one or more target units 314 may include the at least one AI accelerator module and the at least one memory device (see, for example, FIG. 6).

According to various aspects, the control system 200 described herein may be part of or may be an Intel Autonomous Vehicles Platform (e.g., including one or more Intel vehicle OEM Tier1 devices).

According to various aspects, the AI accelerator module described herein may be or may include an Intel Edge AI Chipset.

Figure 3D:
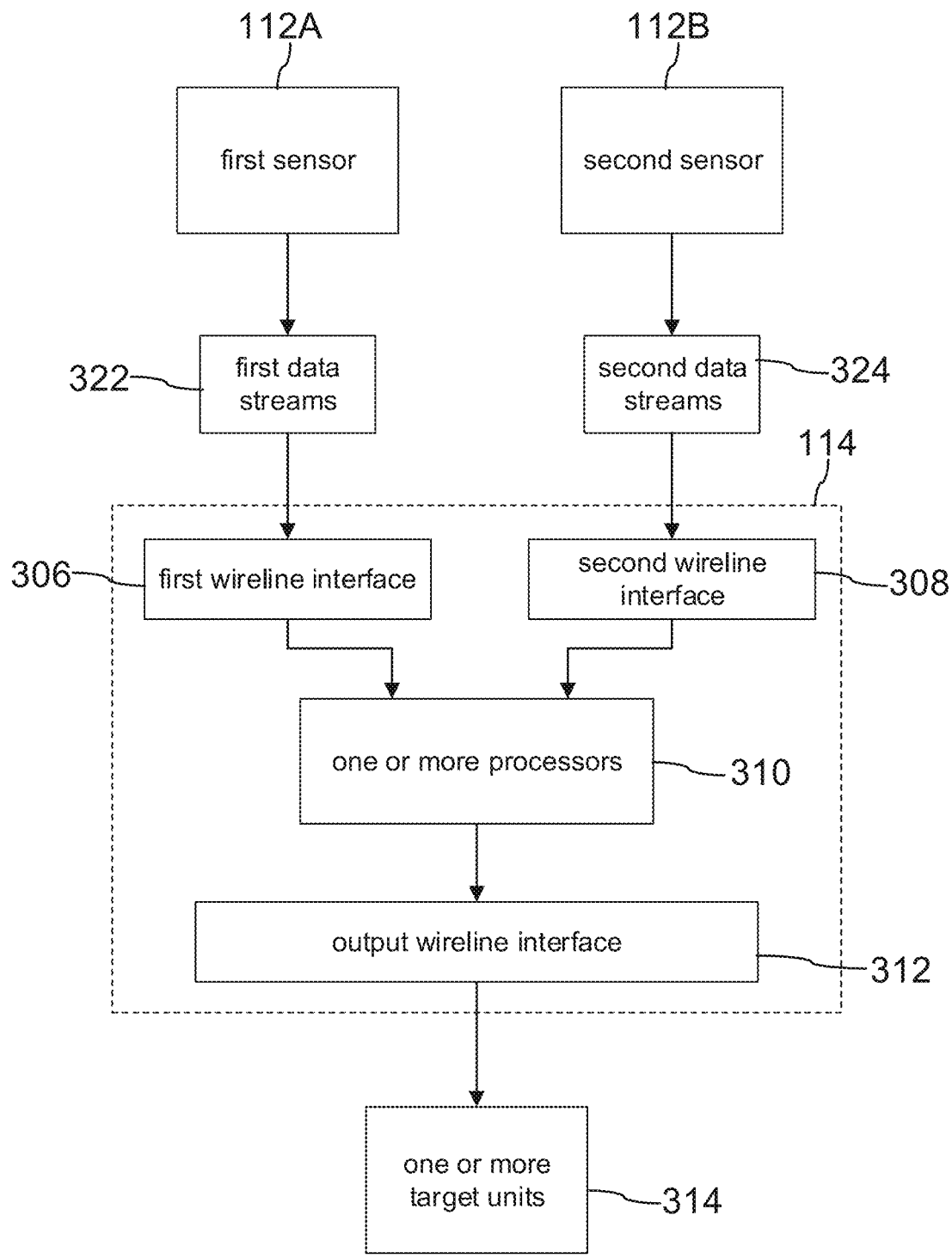

According to various aspects, the one or more processors 310 may be configured to determine the one or more target units 314 associated with the coded packet to be generated. The one or more processors 310 may be configured to determine a number of data streams to be coded to a coded packet (i.e., h in equation (1)). According to various aspects, the one or more processors 310 may be configured to determine the number of data streams to be coded to the coded packet using a machine learning model. The machine learning model may employ a maximum utility function. Various aspects employ dynamic machine learning. The machine learning model may be configured to determine the number of data streams to be coded by learning a link capacity at the time of transmission and a chunk size of each data stream. The link capacity may refer to the capacity of the link (e.g., Ethernet link, e.g., PCIe link, e.g., SATA link, e.g., MIPI CSI link) between the output wireline interface 312 and the respective target unit of the one or more target units 314 or to a capacity of a virtual channel associated with the link. According to various aspects, the maximum utility function may be applied for packet to be coded given by: max $\Sigma_j U_j (x_j)$ such that $\Sigma_j x_j <= C$; C may be the link capacity, $U_j$ may be the utility function associated with each coded stream upon the addition of a j-th stream, and a maximum number of stream, N, to meet C may be described by $1<j<N+1$. Illustratively, the packet size of the coded packet that is function of the number of coded streams is optimized by employing the machine learning model. Illustratively, an online learning of the machine learning model may be performed. According to various aspects, the machine learning model may be trained such that the trained machine learning model is capable to pause or discard some data streams for other higher prioritized data streams to meet a required data throughput to the one or more target units. According to various aspects, the number of data streams included in a coded packet may be determined such that no latency for coding and/or decoding is added. With reference to FIG. 3D, the one or more processors 310 may be configured to select one or more of the plurality of first data streams 322 and one or more of the plurality of second data streams 324 such that a sum of a number of first data streams and a number of second data streams is equal to the determined number of data streams to be coded. The one or more processors 310 may be configured to generated the coded packet by employing vector packet coding on the selected one or more first data streams and the selected one or more second data streams.

FIG. 4A to FIG. 4C each show an exemplary device 114 for transmitting data to an AI accelerator module 314A, in accordance with various aspects of the disclosure. In this example, the output wireline interface 312 may be or may include a MIPI CSI or a PCIe interface. In the case that the output wireline interface 312 is or includes the MIPI CSI, the wireline link between the MIPI CSI and the AI accelerator module 314A may be a MIPI CSI link. In the case that the output wireline interface 312 is or includes the PCIe interface, the wireline link between the PCIe interface and the AI accelerator module 314A may be a PCIe link. According to various aspects, the the device 114 may be configured to transmit the coded packet to the AI accelerator module 314A via a MIPI CSI link in the case that an image signal processing functionality is part of the AI accelerator module 314A and may transmit the coded packet to the AI accelerator module 314A via a PCIe link in the case that the AI accelerator module 314A is or is part of a separate accelerator card.

For illustration, the coded packet is described as being generated for one or more first data streams of the plurality of first data streams 322 and/or one or more second data streams of the plurality of second data streams 324, as described with reference to FIG. 3D. It is noted that each generated coded packet may include a plurality of data streams provided by a plurality of data ingestion devices 112, as described herein.

With reference to FIG. 4B, the one or more processors 310 may be configured to generate a first coded packet 402 and a second coded packet 404. The first coded packet 402 may include one or more first data streams of the plurality of first data streams 322 and one or more second data streams of the plurality of second data streams 324. The second coded packet 404 may include one or more first data streams of the plurality of first data streams 322 and one or more second data streams of the plurality of second data streams 324. The one or more first data streams included in the first coded packet 402 may be different from the one or more first data streams included in the second coded packet 404. The one or more second data streams included in the first coded packet 402 may be different from the one or more second data streams included in the second coded packet 404. The output wireline interface 312 may be configured to transmit (e.g., simultaneously or concurrently transmit) the first coded packet 402 and/or the second coded packet via virtual channels VC associated with the wireline link 406 (e.g., the PCIe link, e.g., the MIPI CSI link).

According to various aspects, the AI accelerator module 314A may include a plurality of artificial intelligence (AI) chips, such as the AI chip 1, the AI chip 2, the AI chip 3, and the AI chip 4. The AI chips of the plurality of AI chips may be chips for redundancy/safety purpose and/or parallel processing. A total number of data ingestion devices 112 providing respective data streams to the device 114 may be greater than a number of AI accelerator modules. The AI chips may be configured to decode the coded packets and to process the data streams included in the coded packets. For example, the AI chips may be configured to employ a machine learning model using the data streams included in a received coded packet as input to the machine learning model and may be configured to provide control instructions for controlling the vehicle 100. For example, the AI chips may be configured to perform an objection detection, an image segementation, an image classification, distance detection, etc. based on the data streams which represent the surrounding of the vehicle 100. According to various aspects, the mobility system 120 may be configured to control the vehicle 100 to operate in accordance with the provided control instructions.

The output wireline interface 312 may be configured to transmit a generated coded packet substantially simultaneously or concurrently to at least two AI chips of the plurality of AI chips. According to various aspects, the one or more processors 310 may be configured to select the at least two AI chips from the plurality of AI chips. Illustratively, a selective broadcast of coded packets may be performed. The at least two AI chips may be, for example, redundancy chips or workload shared chips. For example, the output wireline interface 312 may be configured to transmit the generated first coded packet 402 simultaneously or concurrently to the AI chip 1 and the AI chip 3. For example, the output wireline interface 312 may be configured to transmit the generated second coded packet 404 simultaneously or concurrently to the AI chip 2 and the AI chip 4. The AI accelerator module 314A may include at least one redundancy AI chip associated with an AI chip of the plurality of AI chips included in the AI accelerator module 314A. For example, the AI chip 3 may be a redundancy AI chip for AI chip 1 and AI chip 4 may be a redundancy AI chip for AI chip 2. According to various aspects, the output wireline interface 312 may be configured to transmit a generated second coded packet simultaneously or concurrently to an AI chip (e.g., AI chip 1) and an associated redundancy AI chip (e.g., AI chip 3).

The output wireline interface 312 may be configured to transmit a generated coded packet substantially simultaneously or concurrently to the at least two AI chips of the plurality of AI chips via a corresponding virtual channel VC of a plurality of virtual channels associated with the wireline link 406. For example, the output wireline interface 312 may be configured to transmit the first coded packet 402 simultaneously or concurrently to the AI chip 1 via a first virtual channel VC1 and the AI chip 3 via a third virtual channel VC3. For example, the output wireline interface 312 may be configured to transmit the second coded packet 404 simultaneously or concurrently to the AI chip 2 via a second virtual channel VC2 and the AI chip 4 via a fourth virtual channel VC4. According to various aspects, in the case that the wireline link 406 is a MIPI CSI link, each coded packet may be assigned to a virtual channel VC and a unique channel identification number (VCID) in a header of the respective coded packet. According to various aspects, in the case that the wireline link 406 is a PCIe link, a traffic class (TC) to virtual channel VC mapping may be applied. Here, each coded packet may be assigned to a traffic class. A traffic class may allow for a priority differentiation.

With reference to FIG. 4C, the one or more processors 310 may be configured to generate a third coded packet 408 and a fourth coded packet 410. The third coded packet 408 may include one or more first data streams of the plurality of first data streams 322 and one or more second data streams of the plurality of second data streams 324. The fourth coded packet 410 may include one or more first data streams of the plurality of first data streams 322 and one or more second data streams of the plurality of second data streams 324. The output wireline interface 312 may be configured to transmit each of the first coded packet 402, the second coded packet 404, the third coded packet 408, and/or the fourth coded packet 410 simultaneously or concurrently to a respectively assigned AI chip. The output wireline interface 312 may be configured to transmit each of the first coded packet 402, the second coded packet 404, the third coded packet 408, and/or the fourth coded packet 410 simultaneously or concurrently to the respectively assigned AI chip via a corresponding virtual channel VC. For example, the output wireline interface 312 may be configured to transmit the first coded packet 402 to the AI chip 1 via the first virtual channel VC1, the second coded packet 404 to the AI chip 2 via the second virtual channel VC2, the third coded packet 408 to the AI chip 3 via the third virtual channel VC3, and/or the fourth coded packet 410 to the AI chip 4 via the fourth virtual channel VC4.

FIG. 5A to FIG. 5D each show an exemplary device 114 for transmitting data to a memory device 314B, in accordance with various aspects of the disclosure. In this example, the output wireline interface 312 may be or may include an Ethernet interface or a SATA interface. In the case that the output wireline interface 312 is or includes the Ethernet interface, the wireline link between the Ethernet interface and the memory device 314B may be an Ethernet link. In the case that the output wireline interface 312 is or includes the SATA interface, the wireline link between the SATA interface and the memory device 314B may be a SATA link. Even though the output wireline interface 312 is in this example described as being an Ethernet interface or a SATA interface, it is understood that the output wireline interface 312 may be or may include any other type of interface suitable for a wireline data transmission to a memory device.

Figure 5A:
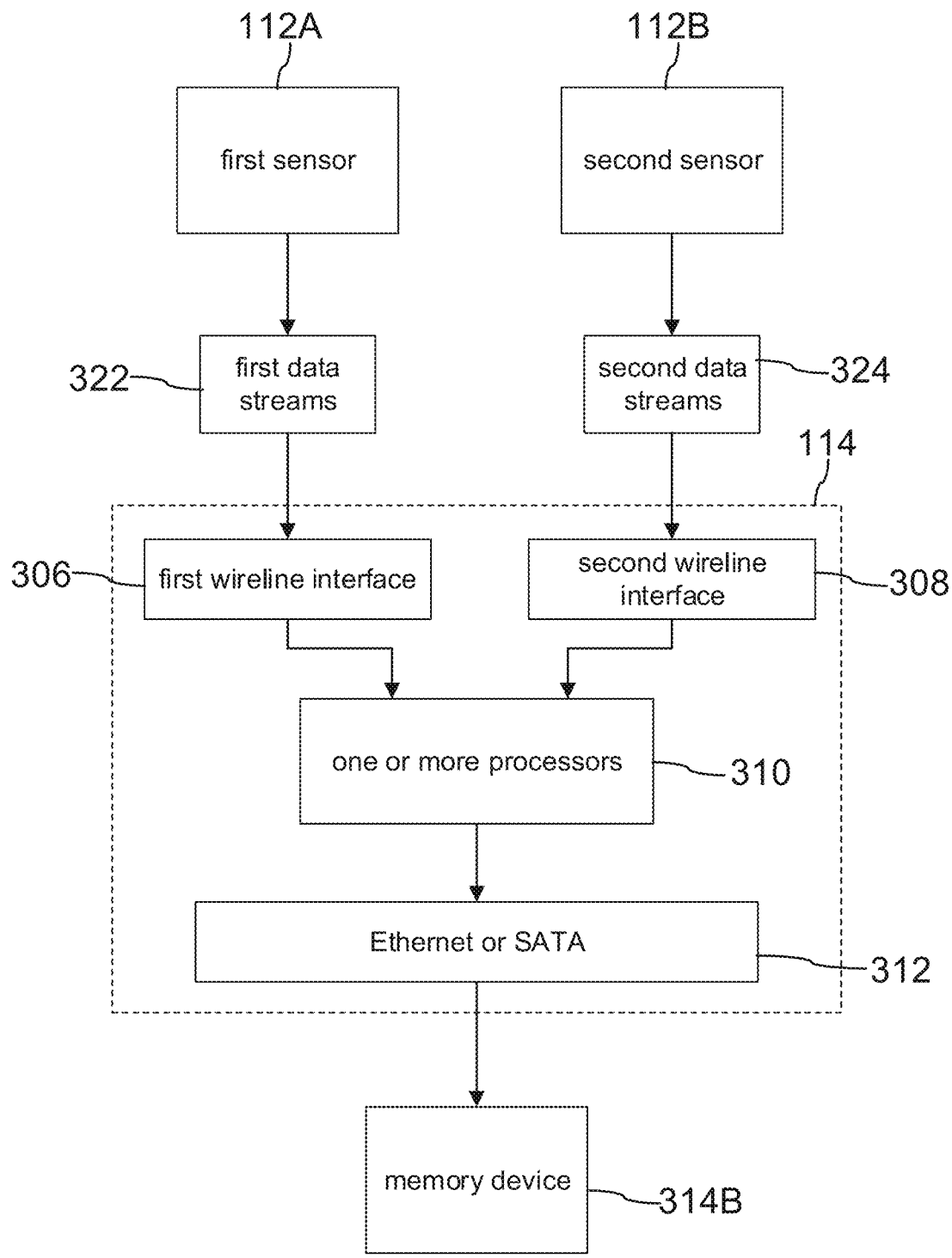
FIG. 5A to FIG. 5D each show an exemplary device for transmitting data to a memory, in accordance with various aspects of the disclosure.

According to various aspects, the Ethernet or SATA interface 312 and the memory device 314B may be connected via a single Ethernet or SATA link (see, for example, FIG. 5A). In this case, the output wireline interface may be configured to transmit the generated coded packets sequentially to the memory device 314B.

Figure 5B:
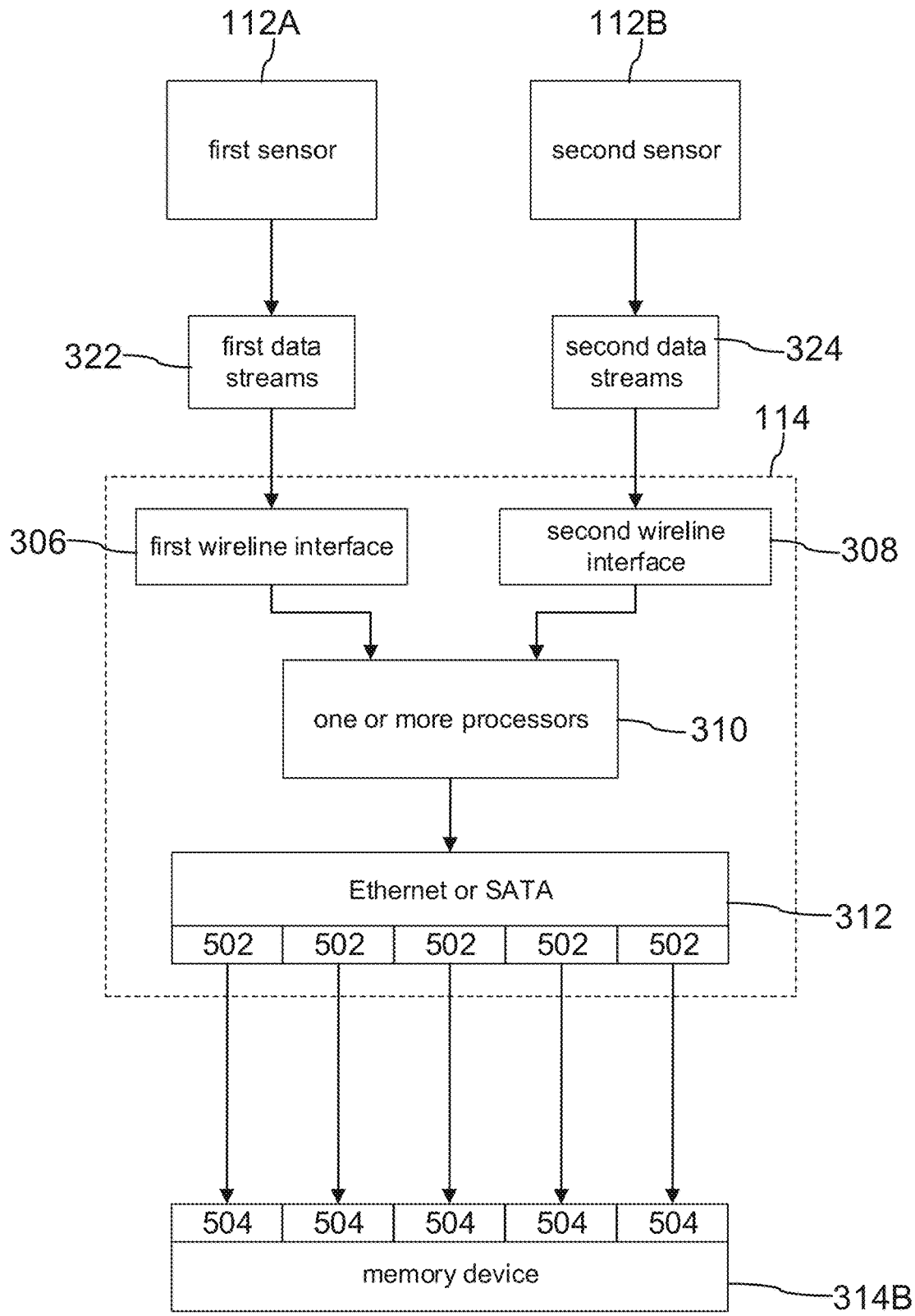

According to various aspects, the Ethernet or SATA interface 312 and the memory device 314B may be connected via a plurality of Ethernet or SATA links (see, for example, FIG. 5B). In this case, the Ethernet or SATA interface 312 may include a plurality of ports 502 and the memory device 314B may include a plurality of ports 504. The Ethernet or SATA interface 312 and the memory device 314B may be connected via the plurality of Ethernet or SATA links and each of the plurality of Ethernet or SATA links may be associated with a port of the plurality of ports 502 of the Ethernet or SATA interface 312 and with a port of the plurality of ports 504 of the memory device 314B. According to various aspects, the one or more processors 310 may be configured to generated a plurality of coded packets and the Ethernet or SATA interface 312 may be configured to transmit the generated plurality of coded packets simultaneously or concurrently to the memory device 314B via a respectively assigned Ethernet or SATA link of the plurality of Ethernet or SATA links.

Each data ingestion device 112 may be configured to provide the respective data streams such that each data stream associated with the respective data ingestion device 112 may include a destination port address indicating the sensor type of the data ingestion device 112. As an example, the TCP/IP protocol may be used including a 16-bit destination port address; the 16-bit destination port address may include a user programmable bit and the user programmable bit may indicate the sensor type of the data ingestion device 112.

For example, the first sensor 112A may have a first sensor type and the second sensor 112B may have a second sensor type different from the first sensor type. In this case, the first sensor 112A may be configured to provide first data streams 322 including a destination port address indicating the first sensor type and the second sensor 112B may be configured to provide second data streams 324 including a destination port address indicating the second sensor type.

Figure 5C:
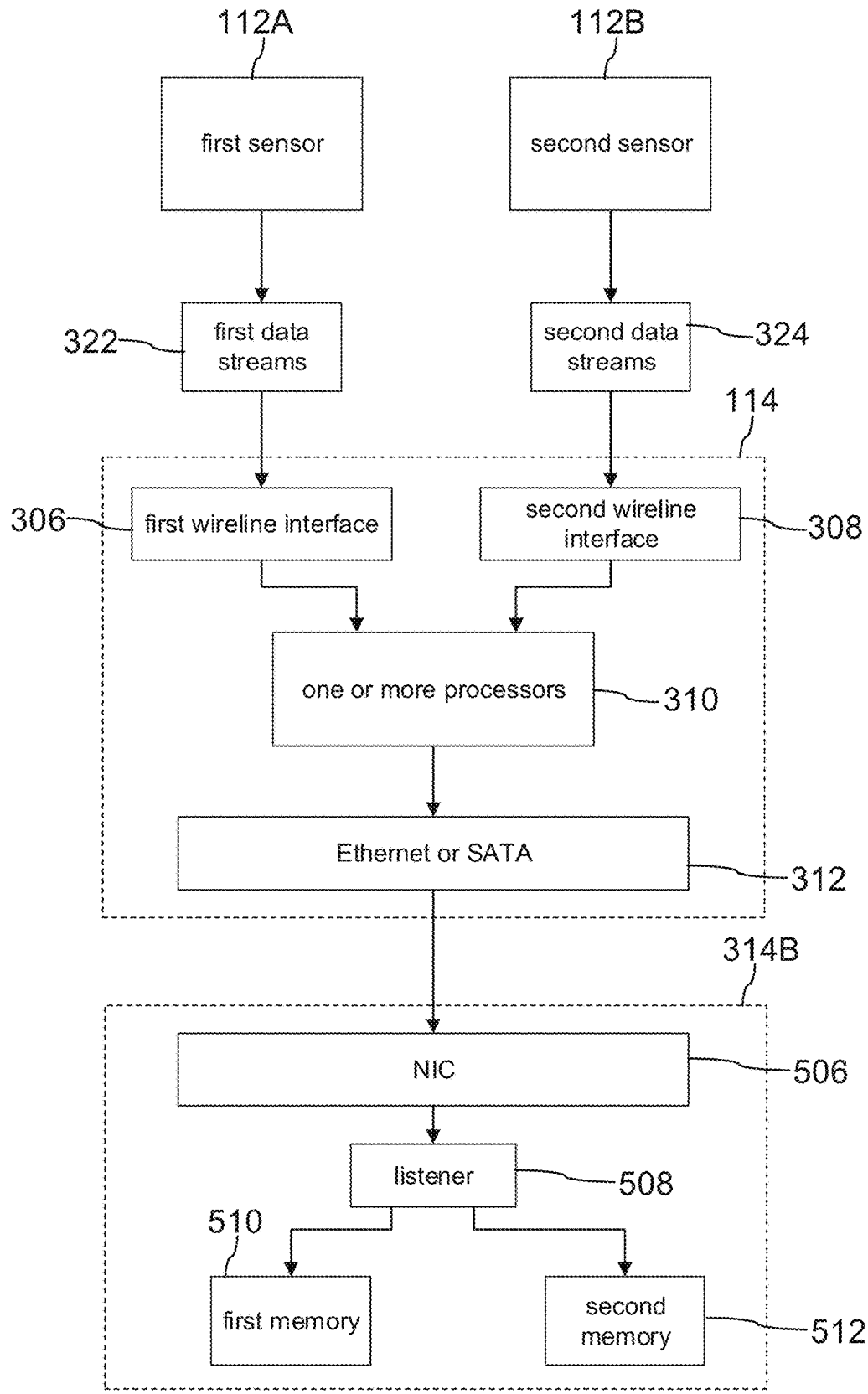

With reference to FIG. 5C, the memory device 314B may include a network interface card (NIC) 506 configured to receive the coded packets from the device 114. The MC 506 may be configured to decode the received coded packets to obtain the data streams included in the coded packets. The NIC 506 may be configured to store the first data streams 322 in a first queue and the second data streams 324 in a second queue using the respective destination port addresses. The memory device 314B may further include a listener 508. The memory device 314B may include a first memory 510 and a second memory 512. The listener 508 may be configured to store the first data streams 322 included in the first queue in the first memory 510 and the second data streams 324 included in the second queue in the second memory 512. For example, the memory device 314B may include a first listener and a second listener; the first listener may be configured to store the first data streams 322 included in the first queue in the first memory 510 and the second listener may be configured to store the second data streams 324 included in the second queue in the second memory 512.

Figure 5D:
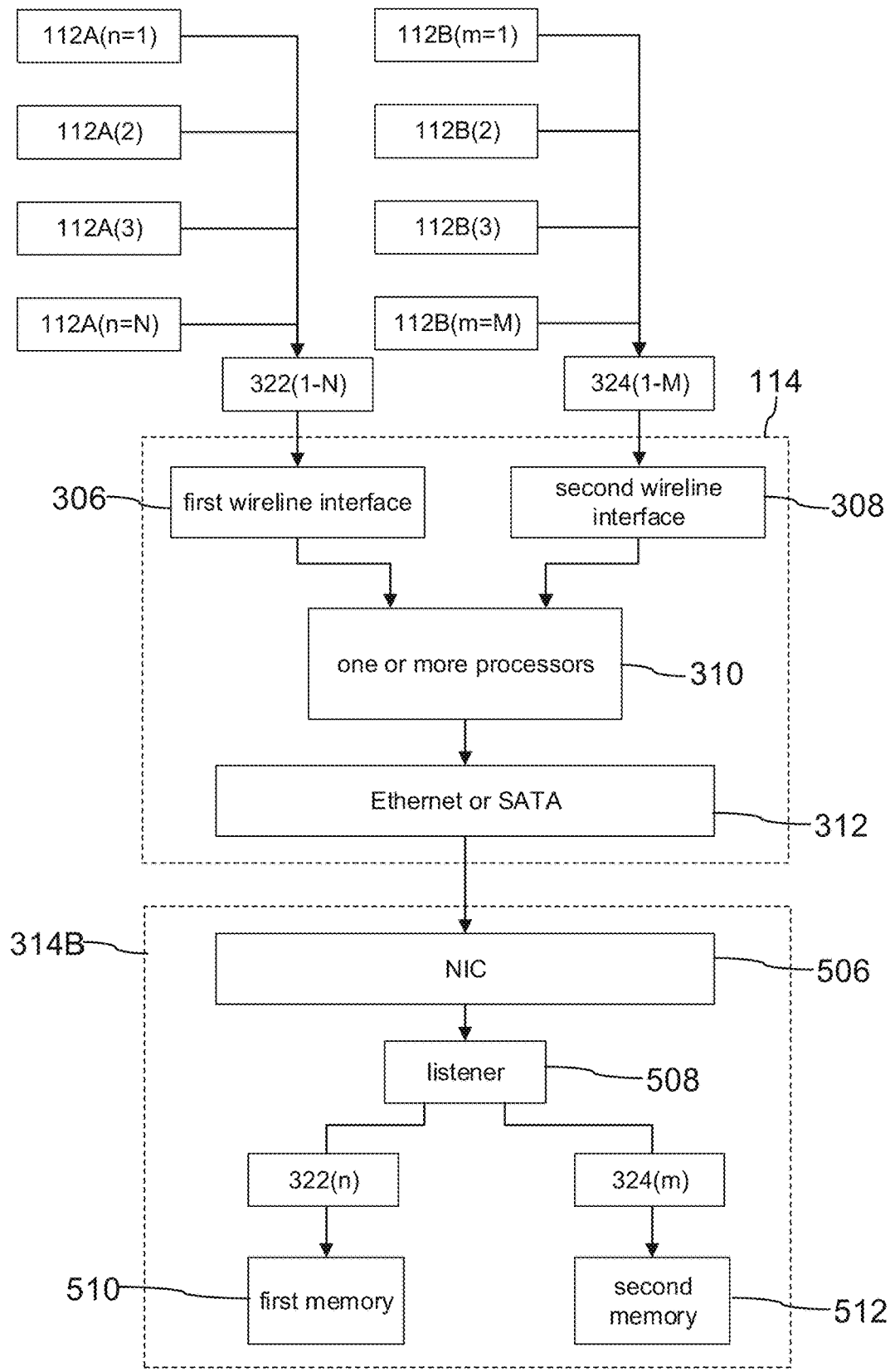

With reference to FIG. 5D, the data ingestion devices 112 may be grouped in a first group of data ingestion devices 112A and a second group of data ingestion devices 112B depending on the sensor type of the data ingestion devices 112. For example, the data ingestion devices 112 may include a number of N image acquisition devices (e.g., cameras) and a number of M proximity acquisition units (e.g., LIDAR sensors, e.g., radar sensors), and the image acquisition devices may be associated with the first group of data ingestion devices 112A and the proximity acquisition devices may be associated with the second group of data ingestion devices 112B. The number N may be any integer number equal to or greater than 1. The number M may be any integer number equal to or greater than 1. According to various aspects, each data ingestion device 112A(n) of the first group of data ingestion devices 112A(n=1–N) may be configured to provide data streams including a destination port address indicating the first group of data ingestion devices 112A. According to various aspects, each data ingestion device 112B(m) of the second group of data ingestion devices 112B(m=1–M) may be configured to provide data streams including a destination port address indicating the second group of data ingestion devices 112B. Hence, the first group of data ingestion devices 112A(1–N)

may provide the plurality of first data streams 322(1–N) and the second group of data ingestion devices 112A(1–M) may provide the plurality of second data streams 324(1–M). Each coded packet generated by the one or more processors 310 may include one or more of the plurality of first data streams 322(n=1–N) and/or one or more of the plurality of second data streams 324(m=1–M). The listener 508 may be configured to read the destination port address of each data stream received by the memory device 314B and may be configured to store the received first data streams 322(n) of the plurality of first data streams 322(n=1–N) in the first memory 510 and to store the received second data streams 324(m) of the plurality of second data streams 322(m=1–M) in the second memory 512.

Illustratively, the system may be configured to perform a sensor-type specific memory (or another resource) allocation. This may enable an efficient handling of sensor-type specific memory (or resource) requirements.

Figure 6:
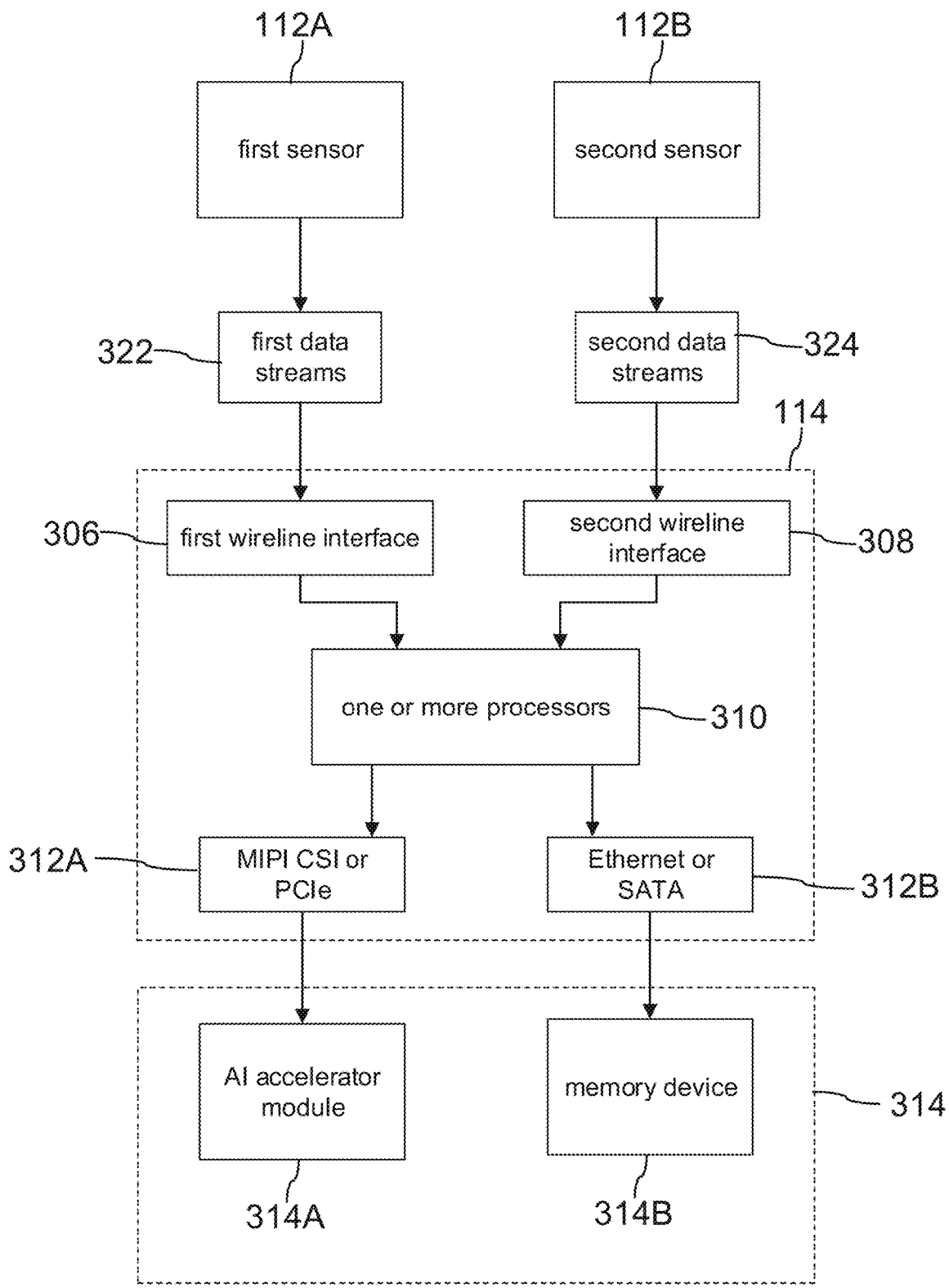
FIG. 6 shows an exemplary device for transmitting data to an AI accelerator module and to a memory, in accordance with various aspects of the disclosure.

FIG. 6 shows an exemplary device 114 for transmitting data to the AI accelerator module 314A and to the memory device 314B, in accordance with various aspects of the disclosure. Acording to various aspects, the device 114 may include a first output wireline interface 312A configured to transmit coded packets to the AI accelerator module 314A. The first output wireline interface (e.g., the MIPI CSI or PCIe interface) and the AI accelerator module 314A may be configured as described with reference to FIG. 4A to FIG. 4C. According to various aspects, the device 114 may include a second output wireline interface 312B configured to transmit coded packets to the memory device 314B. The second output wireline interface (e.g., the Ethernet or SATA interface) and the memory device 314B may be configured as described with reference to FIG. 5A to FIG. 5D.

According to various aspects, the one or more processors 310 may be configured to determine, for each generated coded packet, one or more AI chips of the AI accelerator module and/or the memory device 314B as a transmission target. The one or more processors 310 may be configured to assign a first priority class to a generated coded packet in the case that one or more AI chips are determined as the transmission target and to assign a second priority class to the generated coded packet in the case that the memory device 314B is determined as the transmission target. According to various aspects, the device 114 may be configured to prioritize the transmission of coded packets to which the first priority class is assigned over coded packets to which the second priority class is assigned. For example, the device 114 may include a local memory configured to store the generated coded packets for transmission to the respective transmission target and a read out of the memory may be prioritized for coded packets to which the first priority class is assigned. Illustratively, a data transmission to the AI accelerator module 314A may be time-critical, whereas a data transmission to the memory device 314B may not be time-critical, which is why the data transmission of coded packets to the AI accelerator module 314A may be prioritized over the data transmission of coded packets to the memory device 314B.

According to various aspects, a time constraint of a transmission to the memory 314B may depend on a real-time time constraint of the AI accelerator module 314A since the device 114 needs to cope with the real-time ingestions of the data streams from the data ingestion devices 112.

According to various aspects, the AI chips of the AI accelerator module 314A may be configured to employ a machine learning model and one or more of the data streams stored in the memory device 314B may be used to train (e.g., to further train, e.g., to retrain) the machine learning model.

According to various aspects, the coded packets generated as described herein may be compress by any kind of compression method (e.g., loss-free compression method) and the compressed coded packets may be transmitted. A lossy compression method may reduce the quality of the data and if the data with reduced quality are processed by the AI accelerator module 314B, the accuracy of the output of the AI chips may be reduced. This may reduced the safety of the vehicle 100. In an example, the compression of coded packets may be performed for coded packets to be transmitted to the memory device 314B and may not be performed for coded packets to be transmitted to the AI accelerator module 314A.

Various aspects described herein relate to the generation of coded packets including a plurality of data streams and the transmission of the coded packets. The transmission of the plurality of data streams as a single coded packet may significantly reduce the transmission cost and, thus, may increase the data throughput to the one or more target units (e.g., the AI chips, e.g., the memory device). Further, as an example, a 1 GBit Ethernet cable may not be capable to transmit the high amount of data streamed from the data ingestion devices 112 to the AI accelerator module 314A in real-time and the use of a 10 GBit Ethernet cable may increase the material cost significantly. According to various aspects, the generation of coded packets including a plurality of data streams, as described herein, and the resulting increased data throughput may allow the use of the 1 GBit Ethernet cable in the above example and, thus, reduces the material cost. Hence, according to various aspects, transmission time cost and/or connectivity link cost may be reduced. Illustratively, an ingestion of a high amount of (multi-model) data for Tera Operations (real-time) processing is optimized.

Various aspects described herein relate to a transmission of generated coded packets to selected target units 314 (e.g., the memory device 314B, e.g., one or more AI chips of the AI accelerator module 314A). Illustratively, a selective or targeted transmission (in some aspects referred to as selective or targeted broadcasting) of coded packets is performed.

Various aspects described herein relate to a system capable to store data streams in different memories depending on the sensor type of the sensor, which generated the data streams. The data generated by a sensor may have specific storage requirements depending on the sensor type of the sensor. For example, camera data (e.g., an image) provided by a camera sensor may have different storage requirements than LIDAR data (e.g., a point cloud) provided by a LIDAR sensor. The system described herein is capable to satisfy the specific requirements by storing the data in a respective memory which meets the requirements.

An example of eight cameras providing respective data streams to an AI accelerator module is shown in Table 1. A required number of PCIe links and/or MIPI links to disseminate a workload of the data streams provided by the eight cameras (having 12 Mpixels, a frame rate of 30 fps, and three exposures) to the AI accelerator module may be given or predefined.

TABLE 1

| Parameters | Values | Calculation |
| --- | --- | --- |
| (a) Size (Mpixels) | 12 | |
| (b) Assumed Frame Rate (fps) | 30 | |

TABLE 1-continued

| | | |
|---|---|---|
| (c) Number of Mpixels/sec | 360 | a*b |
| (d) # of camera/streams | 8 | |
| (e) Number of bits/pixel/exposure (~80 dB) | 12 | |
| (f) Gbit/sec for Single Exposure | 4.3 | (c/e)/1000 |
| (g) One stream case: Gbits/sec for all 3 exposures | 12.961728 | f*3 |
| (h) 8 streams case: Gbits/sec for all 3 exposures | 103.693824 | g*d |
| (i) # of MIPI Rx lanes (D-PHY v2.1 @4.5 Gbps/lane) | 23.043072 | h/4.5 |

Without employing Network Coding

| Parameters | Values | Calculation |
|---|---|---|
| (j) ISP Output Gbit/sec for all streams (assume 24 bit/pixel RGB)-after the HDR fusion | 69.13 | ((c*24)/1000) *d |
| (k)# of MIPI Tx lanes (D-PHY v2.1 @4.5 Gbps/lane) | 15.36 | j/4.5 |
| (l) Number of PCIe lanes Gen3 (8 Gbps/lane) | 8.64 | j/8 |
| (m) Number of PCIe lanes Gen4 (16 Gbps/lane) | 4.32 | j/16 |

With employing Network Coding (2 streams encoding at a time, e.g., physically 8 data streams and logically 4 data streams)

| Parameters | Values | Calculation |
|---|---|---|
| (j) ISP Output Gbit/sec for all streams (assume 24 bit/pixel RGB)-after the HDR fusion | 34.56 | ((c*24)/1000) *4 |
| (k)# of MIPI Tx lanes (D-PHY v2.1 @4.5 Gbps/lane) | 7.68 | j/4.5 |
| (l) Number of PCIe lanes Gen3 (8 Gbps/lane) | 4.32 | j/8 |
| (m) Number of PCIe lanes Gen4 (16 Gbps/lane) | 2.16 | j/16 |

With Network Coding (4 streams encoding at a time, e.g., physically 8 data streams and logically 2 data streams)

| Parameters | Values | Calculation |
|---|---|---|
| (j) ISP Output Gbit/sec for all streams (assume 24 bit/pixel RGB)-after the HDR fusion | 17.28 | ((c*24)/1000) *2 |
| (k)# of MIPI Tx lanes (D-PHY v2.1 @4.5 Gbps/lane) | 4.32 | j/4.5 |
| (l) Number of PCIe lanes Gen3 (8 Gbps/lane) | 2.16 | j/8 |
| (m) Number of PCIe lanes Gen4 (16 Gbps/lane) | 1.08 | j/16 |

This example shows that, in the case that no network coding is performed, about 15 MIPI lanes (e.g., MIPI CSI links) are necessary in the case of a MIPI CSI interface and that about 4-8 PCIe lanes (e.g., PCIe links) are necessary in the case of a PCIe interface to cope with the workload. The example shows that, in the case that network coding is performed by combining two data streams to a coded packet, about 7 MIPI lanes (e.g., MIPI CSI links) are necessary in the case of a MIPI CSI interface and that about 2-4 PCIe lanes (e.g., PCIe links) are necessary in the case of a PCIe interface to cope with the workload.

The example shows that, in the case that network coding is performed by combining four data streams to a coded packet, about 4 MIPI lanes (e.g., MIPI CSI links) are necessary in the case of a MIPI CSI interface and that about 1-2 PCIe lanes (e.g., PCIe links) are necessary in the case of a PCIe interface to cope with the workload.

Illustratively, this examples shows that a number of wireline links needed to disseminate data streams to the AI accelerator module 314A is reduced and, thus, material cost may be reduced. Further, a power consumption may also be reduced. This example also shows, that more data streams may be transmitted at a time by employing the vector packet coding, as described herein.

FIG. 7 shows a data transmission method 700 in accordance with various aspects of the disclosure.

The method 700 may include receiving a first data stream from a first sensor having a first sensor type for perceiving a surrounding of a vehicle (in 702). The first data stream may include raw sensor data detected by the first sensor representing the surrounding of the vehicle.

The method 700 may include receiving a second data stream from a second sensor having a second sensor type for perceiving the surrounding of the vehicle (in 704). The second data stream may include raw sensor data detected by the second sensor representing the surrounding of the vehicle. The second sensor may be different from the first sensor. The second sensor type may be different from the first sensor type.

The method 700 may include generating a coded packet including the first data stream and the second data stream by employing vector packet coding on the first data stream and the second data stream (in 706).

The method 700 may include transmitting the generated coded packet to one or more target units of the vehicle (in 708).

According to various aspects, the one or more target units may include at least one AI accelerator module. The at least one AI accelerator module may include a plurality of AI chips and transmitting the generated coded packet to one or more target units of the vehicle may include transmitting the generated coded packet to one or more AI chips of the plurality of AI chips.

According to various aspects, the one or more target units may include at least one memory device. The at least one memory device may include a first memory and a second memory. The first data stream may include a destination port address indicating the first sensor type and the second data stream may include a destination port address indicating the second sensor type. The method may optionally further include: the memory device receiving the generated coded packet and storing the first data stream included in the received coded packet in the first memory and the second data stream included in the received coded packet in the second memory using the respective destination port addresses.

In the following, various aspects of the present disclosure will be illustrated:

Example 1 is a device for a vehicle, the device including: a first wireline interface configured to receive a first data stream from a first sensor having a first sensor type for perceiving a surrounding of the vehicle; a second wireline interface configured to receive a second data stream from a second sensor having a second sensor type for perceiving the surrounding of the vehicle; one or more processors configured to generate a coded packet including the received first data stream and the received second data stream by employing vector packet coding on the first data stream and the second data stream; and an output wireline interface configured to transmit the generated coded packet to one or more target units of the vehicle. The first data stream may include raw sensor data detected by the first sensor representing the surrounding of the vehicle and the second data stream may include raw sensor data detected by the second sensor representing the surrounding of the vehicle.

In Example 2, the subject matter of Example 1 can optionally include that the first sensor is a camera sensor.

In Example 3, the subject matter of Example 1 or 2 can optionally include that the first wireline interface is a Mobile Industry Processor Interface (MIPI) Camera Serial Interface.

In Example 4, the subject matter of any one of Examples 1 to 3 can optionally include that the second sensor is a light detection and ranging (LIDAR) sensor or a radar sensor.

In Example 5, the subject matter of any one of Examples 1 to 4 can optionally include that the second wireline interface is an Ethernet interface.

In Example 6, the subject matter of any one of Examples 1 to 5 can optionally include that the output wireline interface includes a Mobile Industry Processor Interface (MIPI) Camera Serial Interface, a Peripheral Component Interconnect Express interface, an Ethernet interface, and/or a Serial AT Attachment interface.

In Example 7, the subject matter of any one of Examples 1 to 6 can optionally include that the second sensor type is different from the first sensor type.

In Example 8, the subject matter of any one of Examples 1 to 7 can optionally include that each of the one or more target units is configured to decode the coded packet to obtain the first data stream and the second data stream.

In Example 9, the subject matter of any one of Examples 1 to 8 can optionally include that the second wireline interface is further configured to receive a third data stream from a third sensor having a third sensor type for perceiving the surrounding of the vehicle and that the one or more processors are configured to generate the coded packet including the first data stream, the second data stream, and third data stream. The third data stream may include raw sensor data detected by the third sensor representing the surrounding of the vehicle. The third sensor type may be different from the first sensor type and/or the second sensor type.

In Example 10, the subject matter of any one of Examples 1 to 9 can optionally include that the first wireline interface is configured to receive a plurality of first data streams from the first sensor, that the second wireline interface is configured to receive a plurality of second data streams from the second sensor, and that the one or more processors are configured to generate the coded packet such that the generated coded packet includes one or more first data streams of the plurality of first data streams and one or more second data streams of the plurality of second data streams by employing vector packet coding on the one or more first data streams and the one or more second data streams. Each of the plurality of first data streams may include raw sensor data detected by the first sensor and each of the plurality of second data streams may include raw sensor data detected by the second sensor.

In Example 11, the subject matter of Example 10 can optionally include that the one or more processors are configured to generate the coded packet by: determining the one or more target units associated with the coded packet to be generated; determining a number of data streams to be coded to a coded packet using a machine learning model, the machine learning model employing a maximum utility function; selecting the one or more first data streams and the one or more second data streams such that a sum of a number of first data streams and a number of second data streams is equal to the determined number of data streams to be coded; and generating the coded packet by employing vector packet coding on the selected one or more first data streams and the selected one or more second data streams.

In Example 12, the subject matter of Example 10 or 11 can optionally include that the one or more processors are further configured to generate one or more other coded packets, each of the one or more other coded packets including one or more first data streams of the plurality of first data streams and one or more second data streams of the plurality of second data streams.

In Example 13, the subject matter of any one of Examples 1 to 12 can optionally include that the one or more target units include at least one artificial intelligence accelerator module and/or at least one memory device.

In Example 14, the subject matter of any one of Examples 1 to 12 can optionally include that the one or more target units include at least one artificial intelligence accelerator module, the at least one artificial intelligence accelerator module including a plurality of artificial intelligence chips.

In Example 15, the subject matter of Example 14 can optionally include that the output wireline interface is configured to transmit the generated coded packet simultaneously or concurrently to at least two of the plurality of artificial intelligence chips.

In Example 16, the subject matter of Example 15 can optionally include that the output wireline interface is configured to transmit the generated coded packet simultaneously or concurrently to each of the at least two artificial intelligence chips via a corresponding virtual channel of a plurality of virtual channels.

In Example 17, the subject matter of Example 15 or 16 can optionally include that the one or more processors are further configured to select the at least two artificial intelligence chips from the plurality of artificial intelligence chips.

In Example 18, the subject matter of Example 11 and any one of Examples 14 to 17 can optionally include that the output wireline interface is configured to transmit the generated coded packet and each of the generated one or more other coded packets simultaneously or concurrently to at least one respectively assigned artificial intelligence chip of the plurality of artificial intelligence chips.

In Example 19, the subject matter of Example 18 can optionally include that the output wireline interface is configured to transmit the generated coded packet and each of the generated one or more other coded packets simultaneously or concurrently via a corresponding virtual channel of a plurality of virtual channels to the at least one respectively assigned artificial intelligence chip.

In Example 20, the subject matter of any one of Examples 14 to 19 can optionally include that the output wireline interface is a first output wireline interface and that the device further includes a second output wireline interface configured to transmit the generated coded packet to a memory device.

In Example 21, the subject matter of Example 20 can optionally include that the first output wireline interface is a Mobile Industry Processor Interface (MIPI) Camera Serial Interface (CSI) or a Peripheral Component Interconnect Express interface; and/or that the second output wireline interface is an Ethernet interface or a Serial AT Attachment interface.

In Example 22, the subject matter of Example 12 and Example 20 or 21 can optionally include that the second output wireline interface is configured to transmit the generated coded packet and each of the generated one or more other coded packets to the memory device.

In Example 23, the subject matter of Example 22 can optionally include that the second output wireline interface is configured to transmit the generated coded packet and each of the generated one or more other coded packets sequentially to the memory device.

In Example 24, the subject matter of Example 22 can optionally include that the second output wireline interface includes a plurality of output ports and that the second output wireline interface is configured to transmit the generated coded packet and each of the generated one or more other coded packets simultaneously or concurrently to the memory device via a respectively assigned output port of the plurality of output ports.

In Example 25, the subject matter of any one of Examples 22 to 24 can optionally include that the one or more processors are configured to: generate a plurality of coded packets, the plurality of coded packets including the coded packet and the one or more other coded packets, and each of the plurality of coded packets includes respective one or more first data streams of the plurality of first data streams and respective one or more second data streams of the plurality of second data streams; and for each coded packet of the plurality of coded packets, determine one or more of the plurality of artificial intelligence chips and/or the memory as a transmission target of the respective coded packet, and assign a first priority class to the respective coded packet in the case that the one or more artificial intelligence chips are determined as the transmission target and assign a second priority class to the respective coded packet in the case that the memory is determined as the transmission target. The device may be configured to to prioritize the transmission of the coded packets of the plurality of coded packets to which the first priority class is assigned over the coded packets to which the second priority class is assigned.

Example 26 is a system including: the device of any one of Examples 20 to 25; the first sensor having the first sensor type, the first sensor configured to provide the first data stream to the first wireline interface of the device; the second sensor having the second sensor type, the second sensor configured to provide the second data stream to the second wireline interface of the device; and the memory including a first memory and a second memory, the memory device configured to receive the coded packet from the second output wireline interface of the device. The first data stream may include a destination port address indicating the first sensor type, the second data stream may include a destination port address indicating the second sensor type, and the memory device may be configured to store the first data stream included in the received coded packet in the first memory and the second data stream included in the received coded packet in the second memory using the respective destination port addresses.

Example 27 is a system for a vehicle, the system including: one or more first sensors having a first sensor type for perceiving a surrounding of the vehicle, each of the one or more first sensors configured to detect raw sensor data representing the surrounding of the vehicle and to provide the detected raw sensor data as a respective first data stream of one or more first data streams; one or more second sensors having a second sensor type for perceiving the surrounding of the vehicle, each of the one or more second sensors is configured to detect raw sensor data representing the surrounding of the vehicle and to provide the detected raw sensor data as a respective second data stream of one or more second data streams; a device including: a first wireline interface configured to receive the one or more first data streams from the one or more first sensors, a second wireline interface configured to receive the one or more second data streams from the one or more second sensors, one or more processors configured to generate a coded packet including at least one first data stream of the received one or more first data streams and at least one second data stream of the received one or more second data streams; and an output wireline interface configured to transmit the generated coded packet to a memory device; and the memory device including a first memory and a second memory, the memory device configured to receive the coded packet from the output wireline interface of the device. Each first data stream may include a destination port address indicating the first sensor type, each second data stream may include a destination port address indicating the second sensor type, and the memory device may be configured to store the at least one first data stream included in the received coded packet in the first memory and the at least one second data stream included in the received coded packet in the second memory using the respective destination port addresses.

In Example 28, the subject matter of Example 27 can optionally include that the system further includes at least one artificial intelligence accelerator module, the at least one artificial intelligence accelerator module including a plurality of artificial intelligence chips and each of the plurality of artificial intelligence chips is configured to process the first data stream and the second data stream. The output wireline interface of the device may be a second output wireline interface and the device may further include a first output wireline interface, the first output wireline interface configured to transmit the generated coded packet to one or more of the plurality of artificial intelligence chips.

In Example 29, the subject matter of Example 28 can optionally include that a total number of sensors of the one or more first sensors and the one or more second sensors is greater than a number of artificial intelligence accelerator modules of the at least one artificial intelligence accelerator module.

Example 30 is an autonomous vehicle including: one or more camera sensors for perceiving a surrounding of the autonomous vehicle, each of the one or more camera sensors configured to provide a respective first data stream of one or more first data streams; one or more proximity sensors for detecting objects in the surrounding of the autonomous vehicle, each of the one or more proximity sensors configured to provide a respective second data stream of one or more second data streams; a device including: a first wireline interface configured to receive the one or more first data streams, a second wireline interface configured to receive the one or more second data streams, one or more processors configured to generate a coded packet including at least one first data stream of the received one or more first data streams and at least one second data stream of the received one or more second data streams, and an output wireline interface configured to transmit the generated coded packet to one or more artificial intelligence chips of an artificial intelligence accelerator module; the artificial intelligence accelerator module including the one or more artificial intelligence chips, each of the one or more artificial intelligence chips configured to employ a machine learning model using the at least one first data stream and the at least one second data stream as input to the machine learning model to provide control instructions for controlling the autonomous vehicle; and a control system configured to control the autonomous vehicle to operate in accordance with the provided control instructions.

In Example 31, the subject matter of Example 30 can optionally include that the one or more proximity sensors include at least one light detection and ranging (LIDAR) sensor and/or at least one radar sensor.

Example 32 is a computer program element including instructions which, when executed by one or more processors of a vehicle, cause the one or more processors to: employ vector packet coding on a first data stream received from a first sensor having a first sensor type for perceiving a surrounding of the vehicle and a second data stream received from a second sensor having a second sensor type for perceiving the surrounding of the vehicle to generate a coded packet including the first data stream and the second data stream. The first data stream may include raw sensor data detected by the first sensor representing the surrounding of the vehicle and the second data stream may include raw sensor data detected by the second sensor representing the surrounding of the vehicle.

Example 33 is a non-transitory computer-readable medium having instructions recorded thereon which, when executed by one or more processors of a vehicle, cause the one or more processors to: employ vector packet coding on a first data stream received from a first sensor having a first sensor type for perceiving a surrounding of the vehicle and a second data stream received from a second sensor having a second sensor type for perceiving the surrounding of the vehicle to generate a coded packet including the first data stream and the second data stream. The first data stream may include raw sensor data detected by the first sensor representing the surrounding of the vehicle and the second data stream may include raw sensor data detected by the second sensor representing the surrounding of the vehicle.

Example 34 is a method including: receiving a first data stream from a first sensor having a first sensor type for perceiving a surrounding of a vehicle, the first data stream including raw sensor data detected by the first sensor representing the surrounding of the vehicle; receiving a second data stream from a second sensor having a second sensor type for perceiving the surrounding of the vehicle, the second data stream including raw sensor data detected by the second sensor representing the surrounding of the vehicle; generating a coded packet including the first data stream and the second data stream by employing vector packet coding on the first data stream and the second data stream; and transmitting the generated coded packet to one or more target units of the vehicle.

In Example 35, the subject matter of Example 34 can optionally include that the one or more target units include at least one artificial intelligence accelerator module, the at least one artificial intelligence accelerator module including a plurality of artificial intelligence chips, and that transmitting the generated coded packet to the one or more target units includes transmitting the generated coded packet to one or more artificial intelligence chips of the plurality of artificial intelligence chips.

In Example 36, the subject matter of Example 34 can optionally include that the one or more target units include at least one memory device, the at least one memory device including a first memory and a second memory, that the first data stream includes a destination port address indicating the first sensor type and the second data stream includes a destination port address indicating the second sensor type, and that the method further includes: the memory device receiving the generated coded packet and storing the first data stream included in the received coded packet in the first memory and the second data stream included in the received coded packet in the second memory using the respective destination port addresses.

Example 37 is a device for a vehicle including: means for receiving a first data stream from a first sensor having a first sensor type for perceiving a surrounding of a vehicle, the first data stream including raw sensor data detected by the first sensor representing the surrounding of the vehicle; means for receiving a second data stream from a second sensor having a second sensor type for perceiving the surrounding of the vehicle, the second data stream including raw sensor data detected by the second sensor representing the surrounding of the vehicle; means for generating a coded packet including the first data stream and the second data stream by employing vector packet coding on the first data stream and the second data stream; and means transmitting the generated coded packet to one or more target units of the vehicle.

Although the device 114 is described as a device for a vehicle, it is noted that the device 114 may be used in a similar manner in any kind of wireline network which requires or desires a high data throughput, such as a server cluster, server farm, data centers, robot platforms (e.g., autonomous robot platforms, e.g., mobile robot platforms), etc.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device for a vehicle, the device comprising:
    a first wireline interface configured to receive a first data stream from a first sensor having a first sensor type for perceiving a surrounding of the vehicle, wherein the first data stream comprises raw sensor data detected by the first sensor representing the surrounding of the vehicle;
    a second wireline interface configured to receive a second data stream from a second sensor having a second sensor type for perceiving the surrounding of the vehicle, wherein the second data stream comprises raw sensor data detected by the second sensor representing the surrounding of the vehicle;
    one or more processors configured to generate a coded packet comprising the received first data stream and the received second data stream by employing vector packet coding on the first data stream and the second data stream; and
    an output wireline interface configured to transmit the generated coded packet to one or more target units of the vehicle;

wherein the first wireline interface is configured to receive a plurality of first data streams from the first sensor, wherein each of the plurality of first data streams comprises raw sensor data detected by the first sensor;
wherein the second wireline interface is configured to receive a plurality of second data streams from the second sensor, wherein each of the plurality of second data streams comprises raw sensor data detected by the second sensor;
wherein the one or more processors are configured to generate the coded packet such that the generated coded packet comprises one or more first data streams of the plurality of first data streams and one or more second data streams of the plurality of second data streams by employing vector packet coding on the one or more first data streams and the one or more second data streams;
wherein the one or more processors are further configured to generate one or more other coded packets, each of the one or more other coded packets comprising one or more first data streams of the plurality of first data streams and one or more second data streams of the plurality of second data streams; and
wherein the output wireline interface is configured to transmit the generated coded packet and each of the generated one or more other coded packets simultaneously or concurrently via a corresponding virtual channel of a plurality of virtual channels to the at least one respectively assigned artificial intelligence chip.

2. The device of claim 1,
wherein the first sensor is a camera sensor; and
wherein the second sensor is a light detection and ranging sensor or a radar sensor.

3. The device of claim 2,
wherein the first wireline interface is a Mobile Industry Processor Interface Camera Serial Interface; and
wherein the second wireline interface is an Ethernet interface.

4. The device of claim 1,
wherein the output wireline interface comprises a Mobile Industry Processor Interface Camera Serial Interface, a Peripheral Component Interconnect Express interface, an Ethernet interface, or a Serial AT Attachment interface.

5. The device of claim 1,
wherein the second wireline interface is further configured to receive a third data stream from a third sensor having a third sensor type for perceiving the surrounding of the vehicle, wherein the third data stream comprises raw sensor data detected by the third sensor representing the surrounding of the vehicle, and wherein the third sensor type is different from the first sensor type and the second sensor type; and
wherein the one or more processors are configured to generate the coded packet comprising the first data stream, the second data stream, and third data stream.

6. The device of claim 1,
wherein the one or more target units comprise at least one artificial intelligence accelerator module, the at least one artificial intelligence accelerator module comprising a plurality of artificial intelligence chips.

7. The device of claim 6,
wherein the output wireline interface is configured to transmit the generated coded packet simultaneously or concurrently to each of the at least two artificial intelligence chips via a corresponding virtual channel of a plurality of virtual channels.

8. The device of claim 1,
wherein the one or more target units comprise at least one artificial intelligence accelerator module, the at least one artificial intelligence accelerator module comprising a plurality of artificial intelligence chips.

9. The device of claim 6,
wherein the output wireline interface is a first output wireline interface, wherein the device further comprises:
a second output wireline interface configured to transmit the generated coded packet to a memory device.

10. The device of claim 9,
wherein the first output wireline interface is a Mobile Industry Processor Interface Camera Serial Interface or a Peripheral Component Interconnect Express interface; and
wherein the second output wireline interface is an Ethernet interface or a Serial AT Attachment interface.

11. The device of claim 9,
wherein the one or more processors are further configured to generate one or more other coded packets, each of the one or more other coded packets comprising one or more first data streams of the plurality of first data streams and one or more second data streams of the plurality of second data streams; and
wherein the second output wireline interface is configured to transmit the generated coded packet and each of the generated one or more other coded packets sequentially to the memory device.

12. The device of claim 9,
wherein the one or more processors are further configured to generate one or more other coded packets, each of the one or more other coded packets comprising one or more first data streams of the plurality of first data streams and one or more second data streams of the plurality of second data streams; and
wherein the second output wireline interface comprises a plurality of output ports, wherein second output wireline interface is configured to transmit the generated coded packet and each of the generated one or more other coded packets simultaneously or concurrently to the memory device via a respectively assigned output port of the plurality of output ports.

13. The device of claim 12,
wherein the one or more processors are configured to:
generate a plurality of coded packets, the plurality of coded packets comprising the coded packet and the one or more other coded packets, wherein each of the plurality of coded packets comprises respective one or more first data streams of the plurality of first data streams and respective one or more second data streams of the plurality of second data streams; and
for each coded packet of the plurality of coded packets, determine one or more of the plurality of artificial intelligence chips and/or the memory as a transmission target of the respective coded packet, and assign a first priority class to the respective coded packet in the case that the one or more artificial intelligence chips are determined as the transmission target and assign a second priority class to the respective coded packet in the case that the memory is determined as the transmission target; and
wherein the device is configured to prioritize the transmission of the coded packets of the plurality of coded packets to which the first priority class is assigned over the coded packets to which the second priority class is assigned.

14. A system for a vehicle, comprising:
one or more first sensors having a first sensor type for perceiving a surrounding of the vehicle, each of the one or more first sensors configured to detect raw sensor data representing the surrounding of the vehicle and to provide the detected raw sensor data as a respective first data stream of one or more first data streams, wherein each first data stream comprises a destination port address indicating the first sensor type;
one or more second sensors having a second sensor type for perceiving the surrounding of the vehicle, wherein each of the one or more second sensors is configured to detect raw sensor data representing the surrounding of the vehicle and to provide the detected raw sensor data as a respective second data stream of one or more second data streams, wherein each second data stream comprises a destination port address indicating the second sensor type;
a device, comprising:
a first wireline interface configured to receive the one or more first data streams from the one or more first sensors;
a second wireline interface configured to receive the one or more second data streams from the one or more second sensors;
one or more processors configured to generate a coded packet comprising at least one first data stream of the received one or more first data streams and at least one second data stream of the received one or more second data streams; and
an output wireline interface configured to transmit the generated coded packet to a memory device;
the memory device comprising a first memory and a second memory, the memory device configured to receive the coded packet from the output wireline interface of the device and to store the at least one first data stream comprised in the received coded packet in the first memory and the at least one second data stream comprised in the received coded packet in the second memory using the respective destination port addresses;
wherein the first wireline interface is configured to receive a plurality of first data streams from the first sensor, wherein each of the plurality of first data streams comprises raw sensor data detected by the first sensor;
wherein the second wireline interface is configured to receive a plurality of second data streams from the second sensor, wherein each of the plurality of second data streams comprises raw sensor data detected by the second sensor;
wherein the one or more processors are configured to generate the coded packet such that the generated coded packet comprises one or more first data streams of the plurality of first data streams and one or more second data streams of the plurality of second data streams by employing vector packet coding on the one or more first data streams and the one or more second data streams;
wherein the one or more processors are further configured to generate one or more other coded packets, each of the one or more other coded packets comprising one or more first data streams of the plurality of first data streams and one or more second data streams of the plurality of second data streams; and
wherein the output wireline interface is configured to transmit the generated coded packet and each of the generated one or more other coded packets simultaneously or concurrently via a corresponding virtual channel of a plurality of virtual channels to the at least one respectively assigned artificial intelligence chip.

15. The system of claim 14, further comprising:
at least one artificial intelligence accelerator module, the at least one artificial intelligence accelerator module comprising a plurality of artificial intelligence chips, wherein each of the plurality of artificial intelligence chips is configured to process the first data stream and the second data stream;
wherein the output wireline interface of the device is a second output wireline interface, and wherein the device further comprises a first output wireline interface, the first output wireline interface configured to transmit the generated coded packet to one or more of the plurality of artificial intelligence chips.

16. An autonomous vehicle, comprising:
one or more camera sensors for perceiving a surrounding of the autonomous vehicle, each of the one or more camera sensors configured to provide a respective first data stream of one or more first data streams;
one or more proximity sensors for detecting objects in the surrounding of the autonomous vehicle, each of the one or more proximity sensors configured to provide a respective second data stream of one or more second data streams;
a device comprising:
a first wireline interface configured to receive the one or more first data streams;
a second wireline interface configured to receive the one or more second data streams;
one or more processors configured to generate a coded packet comprising at least one first data stream of the received one or more first data streams and at least one second data stream of the received one or more second data streams; and
an output wireline interface configured to transmit the generated coded packet to one or more artificial intelligence chips of an artificial intelligence accelerator module;
the artificial intelligence accelerator module comprising the one or more artificial intelligence chips, each of the one or more artificial intelligence chips configured to employ a machine learning model using the at least one first data stream and the at least one second data stream as input to the machine learning model to provide control instructions for controlling the autonomous vehicle; and
a control system configured to control the autonomous vehicle to operate in accordance with the provided control instructions;
wherein the one or more target units comprise at least one artificial intelligence accelerator module, the at least one artificial intelligence accelerator module comprising a plurality of artificial intelligence chips;
wherein the output wireline interface is a first output wireline interface, wherein the device further comprises:
a second output wireline interface configured to transmit the generated coded packet to a memory device;
wherein the one or more processors are further configured to generate one or more other coded packets, each of the one or more other coded packets comprising one or more first data streams of the plurality of first data streams and one or more second data streams of the plurality of second data streams; and wherein the second output wireline interface comprises a plurality of output ports, wherein second output wireline interface is configured to transmit the generated coded packet and each of the generated one or more other coded packets simultaneously or concurrently to the memory device via a respectively assigned output port of the plurality of output ports.

17. The autonomous vehicle of claim 16, further comprising:
wherein the one or more proximity sensors comprise at least one light detection and ranging sensor and/or at least one radar sensor.

* * * * *